(12) United States Patent
Yamakage et al.

(10) Patent No.: US 9,787,946 B2
(45) Date of Patent: Oct. 10, 2017

(54) PICTURE PROCESSING DEVICE AND METHOD

(71) Applicant: FUJITSU LIMITED, Kawasaki (JP)

(72) Inventors: Yuzuru Yamakage, Kawasaki (JP); Shingo Hamaguchi, Kawasaki (JP); Kazuyuki Ozaki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 621 days.

(21) Appl. No.: 13/683,601

(22) Filed: Nov. 21, 2012

(65) Prior Publication Data

US 2013/0083197 A1 Apr. 4, 2013

Related U.S. Application Data

(63) Continuation of application No. PCT/JP2010/058774, filed on May 25, 2010.

(51) Int. Cl.
*H04N 7/18* (2006.01)
*G07C 5/08* (2006.01)
(Continued)

(52) U.S. Cl.
CPC ............... *H04N 7/18* (2013.01); *G06T 7/73* (2017.01); *G07C 5/0891* (2013.01); *G09B 9/042* (2013.01);
(Continued)

(58) Field of Classification Search
CPC .................................. G09B 9/052; G08G 1/00
(Continued)

(56) References Cited

U.S. PATENT DOCUMENTS 6,200,139 B1 * 3/2001 Clapper ................. G09B 9/042
434/62
8,872,910 B1 * 10/2014 Vaziri .................... G02C 11/10
348/77
(Continued)

FOREIGN PATENT DOCUMENTS

JP 2004-21307 1/2004
JP 2004-164338 6/2004
(Continued)

OTHER PUBLICATIONS

International Preliminary Report mailed Dec. 6, 2012 issued in corresponding International Patent Application No. PCT/JP2010/058774 (Notification of Transmittal of Translation enclosed).
(Continued)

*Primary Examiner* — Chikaodili E Anyikire
(74) *Attorney, Agent, or Firm* — Staas & Halsey LLP

(57) ABSTRACT

The disclosed video processing device contains: a video acquisition unit that acquires surroundings information including video taken of the surroundings of a vehicle; a line-of-sight acquisition unit that acquires the origin and direction of the line of sight of the driver of the aforementioned vehicle; a line-of-sight video generation unit which generates, from the surroundings information, line-of-sight video corresponding to the origin of the line of sight; a blocking-information computation unit that computes, on the basis of the origin of the line of sight, blocking information including video or a region of the body of the aforementioned vehicle that blocks the driver's line of sight; and a display-video generation unit that generates display video on the basis of the line-of-sight video and the blocking information.

12 Claims, 38 Drawing Sheets

(51) Int. Cl.
  *G09B 9/042* (2006.01)
  *G09B 9/05* (2006.01)
  *G09B 9/052* (2006.01)
  *G09B 19/16* (2006.01)
  *G06T 7/73* (2017.01)

(52) U.S. Cl.
  CPC ............... *G09B 9/05* (2013.01); *G09B 9/052* (2013.01); *G09B 19/167* (2013.01); *G06T 2207/10016* (2013.01); *G06T 2207/30248* (2013.01)

(58) Field of Classification Search
  USPC .......................................................... 348/148
  See application file for complete search history.

(56) References Cited

U.S. PATENT DOCUMENTS

| | | | | |
|---|---|---|---|---|
| 2003/0108222 | A1* | 6/2003 | Sato | H04N 7/183 382/104 |
| 2004/0260469 | A1 | 12/2004 | Mizusawa | |
| 2007/0081262 | A1* | 4/2007 | Oizumi | B60R 1/00 359/843 |
| 2007/0279590 | A1* | 12/2007 | Ebisawa | A61B 3/113 351/208 |
| 2010/0103077 | A1* | 4/2010 | Sugiyama | G02B 27/017 345/8 |
| 2010/0194887 | A1* | 8/2010 | Ono | G07C 5/0891 348/148 |
| 2011/0249868 | A1* | 10/2011 | Tsukizawa | A61B 3/113 382/103 |
| 2013/0083197 | A1* | 4/2013 | Yamakage | G06T 7/0042 348/148 |

FOREIGN PATENT DOCUMENTS

| | | |
|---|---|---|
| JP | 2006-88722 | 4/2006 |
| JP | 2006-290304 | 10/2006 |
| JP | 2007-11148 | 1/2007 |
| JP | 2009-279146 | 12/2009 |
| JP | 2010/109684 | 5/2010 |

OTHER PUBLICATIONS

Japanese Office Action Mailed Apr. 16, 2013 in corresponding Japanese Patent Application No. 2012-517009.
International Preliminary Report mailed Dec. 10, 2012 issued in corresponding International Patent Application No. PCT/JP2010/058774 (Notification of Transmittal of Translation enclosed).
International Search Report of PCT/JP2010/058774 mailed Sep. 7, 2010.

* cited by examiner

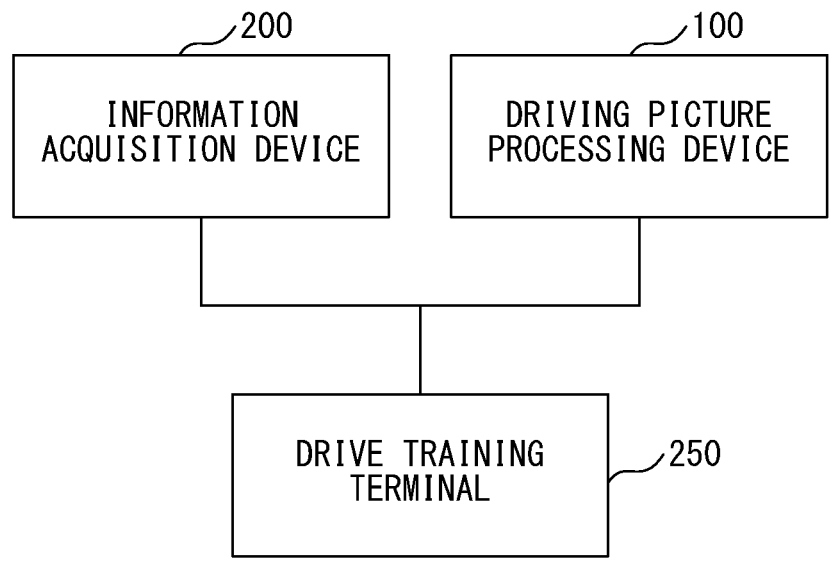
F I G. 1

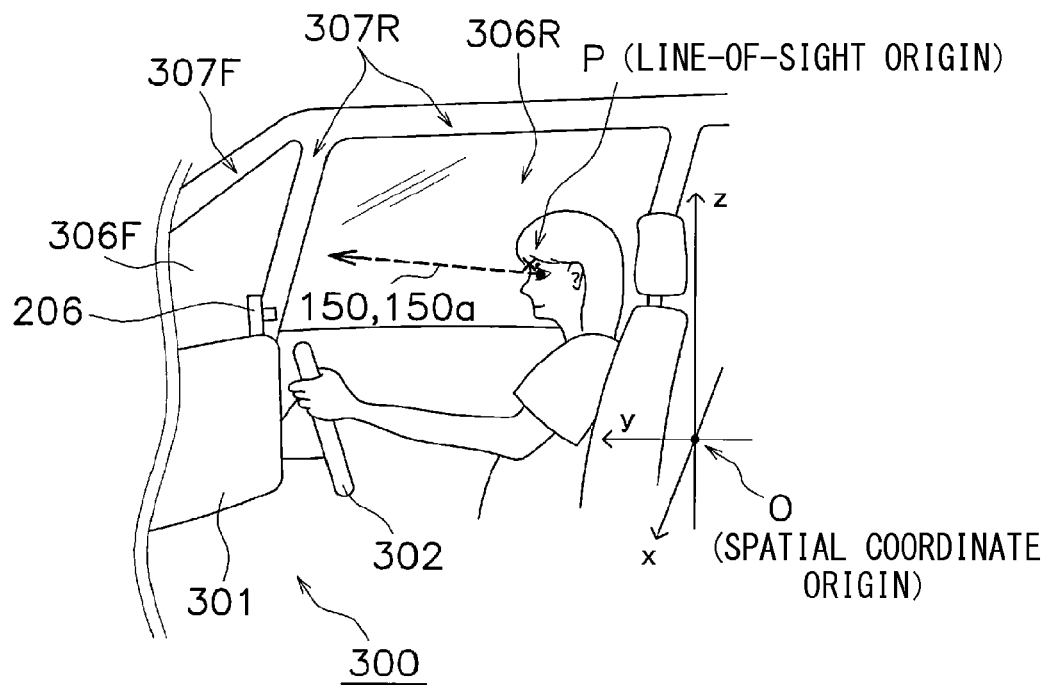
F I G. 4

| FRAME NUMBER | PICTURE DATA | | | |
| --- | --- | --- | --- | --- |
| | FORWARD CAMERA | RIGHT CAMERA | LEFT CAMERA | BACKWARD CAMERA |
| 1 | FORWARD PICTURE_1 | RIGHT PICTURE_1 | LEFT PICTURE_1 | BACKWARD PICTURE_1 |
| 2 | FORWARD PICTURE_2 | RIGHT PICTURE_2 | LEFT PICTURE_2 | BACKWARD PICTURE_2 |
| 3 | FORWARD PICTURE_3 | RIGHT PICTURE_3 | LEFT PICTURE_3 | BACKWARD PICTURE_3 |
| ⋮ | ⋮ | ⋮ | ⋮ | ⋮ |

FIG. 10

| FRAME NUMBER | LINE-OF-SIGHT DATA ||||
|---|---|---|---|---|---|
| | LINE-OF-SIGHT ORIGIN P | LINE-OF-SIGHT VECTOR || MIRROR EXISTING IN EFFECTIVE VISION RANGE? | EFFECTIVE VISION RANGE |
| | | AZIMUTH | ELEVATION ANGLE | | |
| 1 | $(X_{P1}, Y_{P1}, Z_{P1})$ | $\theta_{\alpha-1}$ | $\theta_{\beta-1}$ | BACK MIRROR | RANGE-1 |
| 2 | $(X_{P2}, Y_{P2}, Z_{P2})$ | $\theta_{\alpha-2}$ | $\theta_{\beta-2}$ | BACK MIRROR | RANGE-2 |
| 3 | $(X_{P3}, Y_{P3}, Z_{P3})$ | $\theta_{\alpha-3}$ | $\theta_{\beta-3}$ | BACK MIRROR / LEFT DOOR MIRROR | RANGE-3 |
| 4 | $(X_{P4}, Y_{P4}, Z_{P4})$ | $\theta_{\alpha-4}$ | $\theta_{\beta-4}$ | NO | RANGE-4 |
| 5 | $(X_{P5}, Y_{P5}, Z_{P5})$ | $\theta_{\alpha-5}$ | $\theta_{\beta-5}$ | NO | RANGE-5 |
| 6 | $(X_{P6}, Y_{P6}, Z_{P6})$ | $\theta_{\alpha-6}$ | $\theta_{\beta-6}$ | BACK MIRROR | RANGE-6 |
| 7 | $(X_{P7}, Y_{P7}, Z_{P7})$ | $\theta_{\alpha-7}$ | $\theta_{\beta-7}$ | LEFT DOOR MIRROR | RANGE-7 |
| ⋮ | ⋮ | ⋮ | ⋮ | ⋮ | ⋮ |

FIG. 11

| LINE-OF-SIGHT ORIGIN P | LINE-OF-SIGHT VECTOR | | CAR WINDOW VISION AREA ON 3-DIMENSIONAL PROJECTION SURFACE | INTERSECTION SP WITH 3-DIMENSIONAL PROJECTION SURFACE |
|---|---|---|---|---|
| | AZIMUTH | ELEVATION ANGLE | | |
| X1, Y1, Z1 | $\theta \alpha a$ | $\theta \beta a$ | CAR WINDOW VISION AREA 1a | X1a, Y1a, Z1a |
| | $\theta \alpha b$ | $\theta \beta b$ | CAR WINDOW VISION AREA 1b | X1b, Y1b, Z1b |
| | $\theta \alpha c$ | $\theta \beta c$ | CAR WINDOW VISION AREA 1c | X1c, Y1c, Z1c |
| | ⋮ | ⋮ | ⋮ | ⋮ |
| X2, Y2, Z2 | $\theta \alpha a$ | $\theta \beta a$ | CAR WINDOW VISION AREA 2a | X2a, 2a, Z2a |
| | $\theta \alpha b$ | $\theta \beta b$ | CAR WINDOW VISION AREA 2b | X2b, Y2b, Z2b |
| | ⋮ | ⋮ | ⋮ | ⋮ |
| ⋮ | ⋮ | ⋮ | ⋮ | ⋮ |

FIG. 13

| MODEL | LINE-OF-SIGHT ORIGIN P | LINE-OF-SIGHT VECTOR | | CAR WINDOW CUTOFF INFORMATION |
|---|---|---|---|---|
| | | AZIMUTH | ELEVATION ANGLE | |
| A | X1, Y1, Z1 | $\theta \alpha a$ | $\theta \beta a$ | CAR WINDOW CUTOFF INFORMATION A1a |
| | | $\theta \alpha b$ | $\theta \beta b$ | CAR WINDOW CUTOFF INFORMATION A1b |
| | | $\theta \alpha c$ | $\theta \beta c$ | CAR WINDOW CUTOFF INFORMATION A1c |
| | | ⋮ | ⋮ | ⋮ |
| | X2, Y2, Z2 | $\theta \alpha a$ | $\theta \beta a$ | CAR WINDOW CUTOFF INFORMATION A2a |
| | | $\theta \alpha b$ | $\theta \beta b$ | CAR WINDOW CUTOFF INFORMATION A2b |
| | | ⋮ | ⋮ | ⋮ |
| | ⋮ | ⋮ | ⋮ | ⋮ |
| B | X1, Y1, Z1 | $\theta \alpha a$ | $\theta \beta a$ | CAR WINDOW CUTOFF INFORMATION B1a |
| | | $\theta \alpha b$ | $\theta \beta b$ | CAR WINDOW CUTOFF INFORMATION B1b |
| | | ⋮ | ⋮ | ⋮ |
| | ⋮ | ⋮ | ⋮ | ⋮ |
| ⋮ | ⋮ | ⋮ | ⋮ | ⋮ |

| MODEL | MIRROR INFORMATION | | | LINE-OF-SIGHT ORIGIN P | VIRTUAL LINE-OF-SIGHT ORIGIN VP | MIRROR VISION FIELD ANGLE | MIRROR VISION AREA IN 3-DIMENSIONAL PROJECTION SURFACE | MIRROR CUTOFF INFORMATION |
|---|---|---|---|---|---|---|---|---|
| | POSITION | ANGLE | | | | | | |
| | | $\theta\gamma$ | $\theta\delta$ | | | | | |
| A | $X_{m1}, Y_{m1}, Z_{m1}$ | $\theta\gamma a$ | $\theta\delta a$ | $X_1, Y_1, Z_1$ | $X_{A1a}, Y_{A1a}, Z_{A1a}$ | $\theta_{mA1a}$ | BACK MIRROR VISION AREA A1a | BACK MIRROR CUTOFF INFORMATION A1a |
| | | | | | | | RIGHT MIRROR VISION AREA A1a | RIGHT MIRROR CUTOFF INFORMATION A1a |
| | | | | | | | LEFT MIRROR VISION AREA A1a | LEFT MIRROR CUTOFF INFORMATION A1a |
| | | $\theta\gamma b$ | $\theta\delta b$ | | $X_{A1b}, Y_{A1b}, Z_{A1b}$ | $\theta_{mA1b}$ | BACK MIRROR VISION AREA A1b | BACK MIRROR CUTOFF INFORMATION A1b |
| | | | | | | | RIGHT MIRROR VISION AREA A1b | RIGHT MIRROR CUTOFF INFORMATION A1b |
| | | | | | | | LEFT MIRROR VISION AREA A1b | LEFT MIRROR CUTOFF INFORMATION A1b |
| | | $\theta\gamma c$ | $\theta\delta c$ | | $X_{A1c}, Y_{A1c}, Z_{A1c}$ | $\theta_{mA1c}$ | BACK MIRROR VISION AREA A1c | BACK MIRROR CUTOFF INFORMATION A1c |
| | | | | | | | RIGHT MIRROR VISION AREA A1c | RIGHT MIRROR CUTOFF INFORMATION A1c |
| | | | | | | | LEFT MIRROR VISION AREA A1c | LEFT MIRROR CUTOFF INFORMATION A1c |
| | | ... | ... | ... | ... | ... | ... | ... |

| | | | | | | | | | |
|---|---|---|---|---|---|---|---|---|---|
| A | $X_{m1}, Y_{m1}, Z_{m1}$ | $\theta\gamma a$ | $\theta\delta a$ | X2, Y2, Z2 | $X_{A2a}, Y_{A2a}, Z_{A2a}$ | $\theta_{mA2a}$ | BACK MIRROR VISION AREA A2a | BACK MIRROR CUTOFF INFORMATION A2a | |
| | | | | | | | RIGHT MIRROR VISION AREA A2a | RIGHT MIRROR CUTOFF INFORMATION A2a | |
| | | | | | | | LEFT MIRROR VISION AREA A2a | LEFT MIRROR CUTOFF INFORMATION A2a | |
| | | $\theta\gamma b$ | $\theta\delta b$ | ... | ... | ... | ... | ... | |
| | | ... | ... | ... | ... | ... | ... | ... | |
| B | $X_{m2}, Y_{m2}, Z_{m2}$ | $\theta\gamma a$ | $\theta\delta a$ | X1, Y1, Z1 | $X_{B1a}, Y_{B1a}, Z_{B1a}$ | $\theta_{mB1a}$ | BACK MIRROR VISION AREA B1a | BACK MIRROR CUTOFF INFORMATION B1a | |
| | | | | | | | RIGHT MIRROR VISION AREA B1a | RIGHT MIRROR CUTOFF INFORMATION B1a | |
| | | | | | | | LEFT MIRROR VISION AREA B1a | LEFT MIRROR CUTOFF INFORMATION B1a | |
| | | ... | ... | ... | ... | ... | ... | ... | |
| | | ... | ... | ... | ... | ... | ... | ... | |
| ... | ... | | | | | | | | |

FIG. 16B

| LINE-OF-SIGHT ORIGIN P | LINE-OF-SIGHT VECTOR | | MIRROR DISPLAY AREA | | |
|---|---|---|---|---|---|
| | AZIMUTH | ELEVATION ANGLE | BACK MIRROR | RIGHT MIRROR | LEFT MIRROR |
| X1, Y1, Z1 | θαa | θβa | BACK MIRROR DISPLAY AREA 1a | RIGHT MIRROR DISPLAY AREA 1a | — |
| | θαb | θβb | BACK MIRROR DISPLAY AREA 1b | RIGHT MIRROR DISPLAY AREA 1b | LEFT MIRROR DISPLAY AREA 1b |
| | ... | ... | ... | ... | ... |
| X2, Y2, Z2 | θαa | θβa | BACK MIRROR DISPLAY AREA 2a | RIGHT MIRROR DISPLAY AREA 2a | LEFT MIRROR DISPLAY AREA 2a |
| | ... | ... | ... | ... | ... |
| ... | ... | ... | ... | ... | ... |

F I G. 2 0

| FRAME NUMBER | CAR WINDOW PICTURE |
|---|---|
| 1 | CAR WINDOW PICTURE_1 |
| 2 | CAR WINDOW PICTURE_2 |
| 3 | CAR WINDOW PICTURE_3 |
| 4 | CAR WINDOW PICTURE_4 |
| ⋮ | ⋮ |

FIG. 21

| FRAME NUMBER | MIRROR EXISTING IN EFFECTIVE VISION RANGE? | MIRROR PICTURE |
|---|---|---|
| 1 | NO | – |
| 2 | BACK MIRROR | BACK MIRROR PICTURE_2 |
| 3 | BACK MIRROR | BACK MIRROR PICTURE_3 |
| 4 | BACK MIRROR | BACK MIRROR PICTURE_4 |
|   | RIGHT DOOR MIRROR | RIGHT MIRROR PICTURE_4 |
| ⋮ | ⋮ | ⋮ |

FIG. 22

| FRAME NUMBER | CAR WINDOW CUTOFF INFORMATION | MIRROR EXISTING IN EFFECTIVE VISION RANGE? | MIRROR CUTOFF INFORMATION |
|---|---|---|---|
| 1 | CAR WINDOW CUTOFF INFORMATION _1 | NO | - |
| 2 | CAR WINDOW CUTOFF INFORMATION _2 | BACK MIRROR | BACK MIRROR CUTOFF INFORMATION_2 |
| 3 | CAR WINDOW CUTOFF INFORMATION _3 | BACK MIRROR | BACK MIRROR CUTOFF INFORMATION_3 |
| 4 | CAR WINDOW CUTOFF INFORMATION _4 | BACK MIRROR | BACK MIRROR CUTOFF INFORMATION_4 |
| | | RIGHT DOOR MIRROR | RIGHT MIRROR CUTOFF INFORMATION_4 |
| ⋮ | ⋮ | ⋮ | ⋮ |

FIG. 23

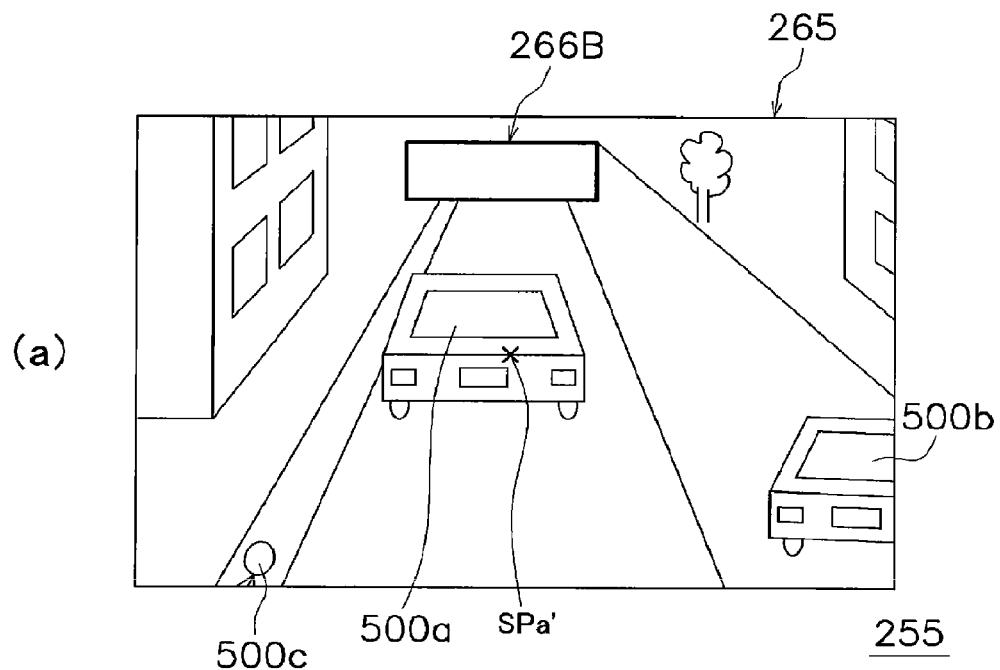
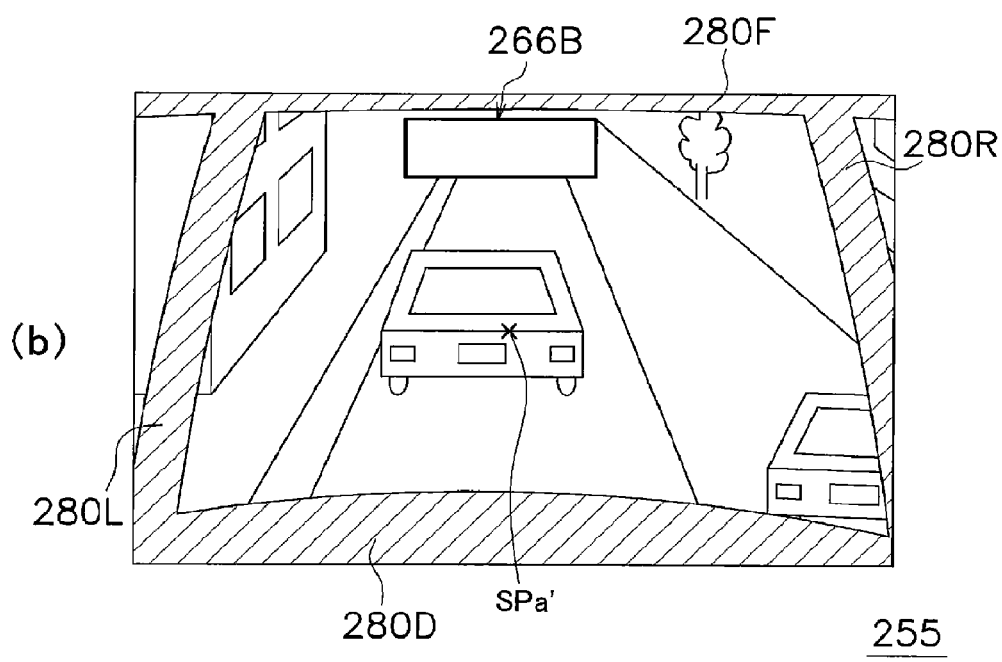
FIG. 25

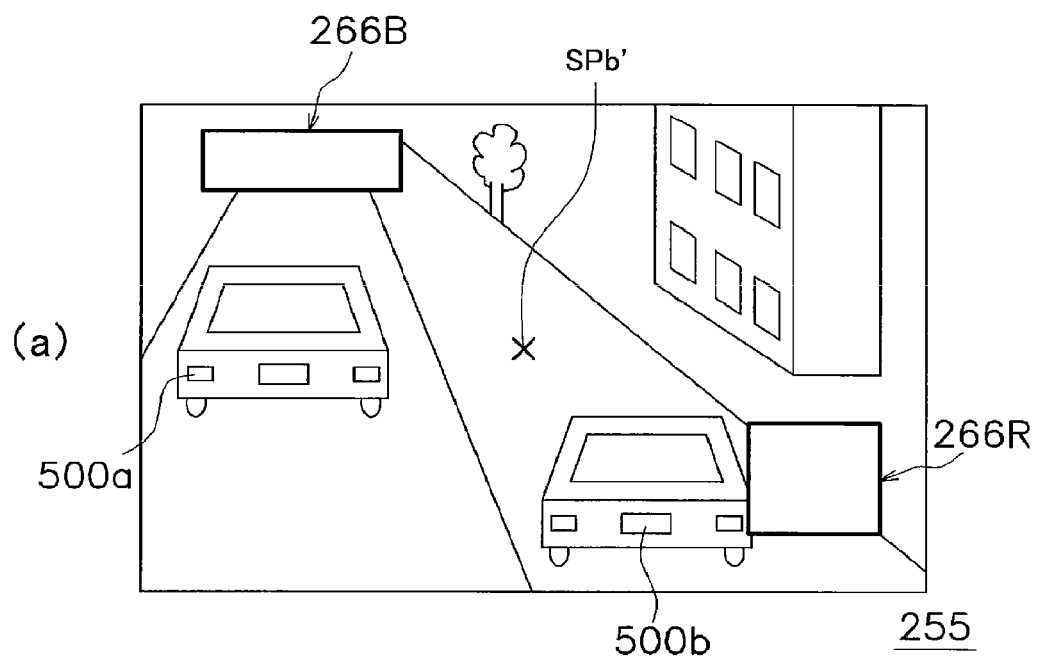
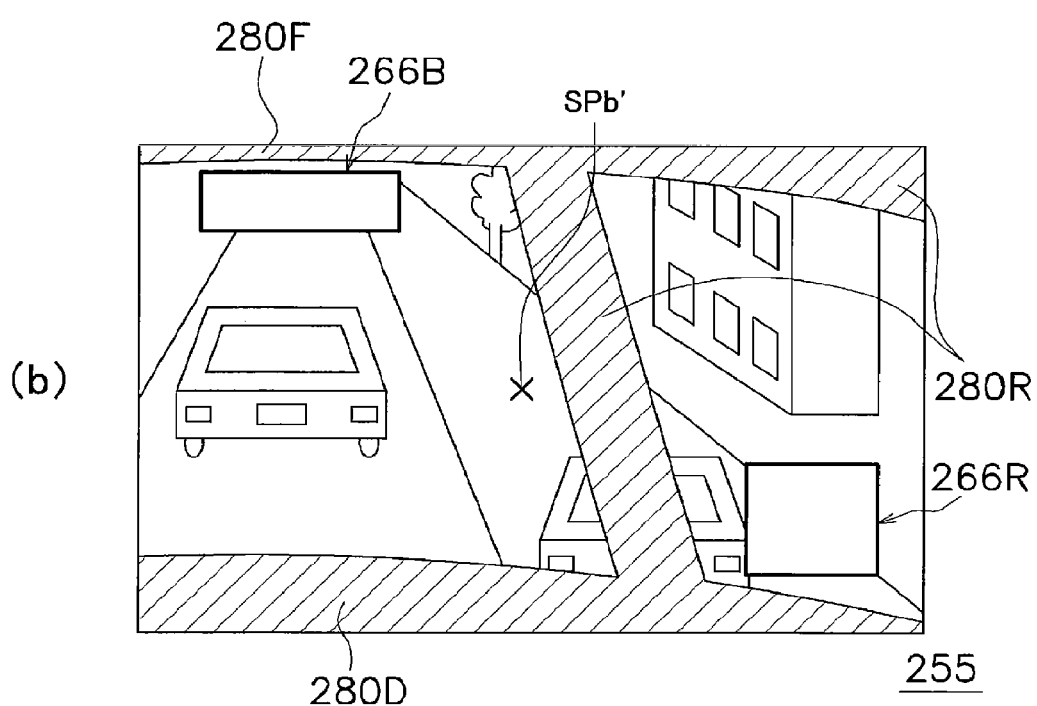
F I G. 2 6

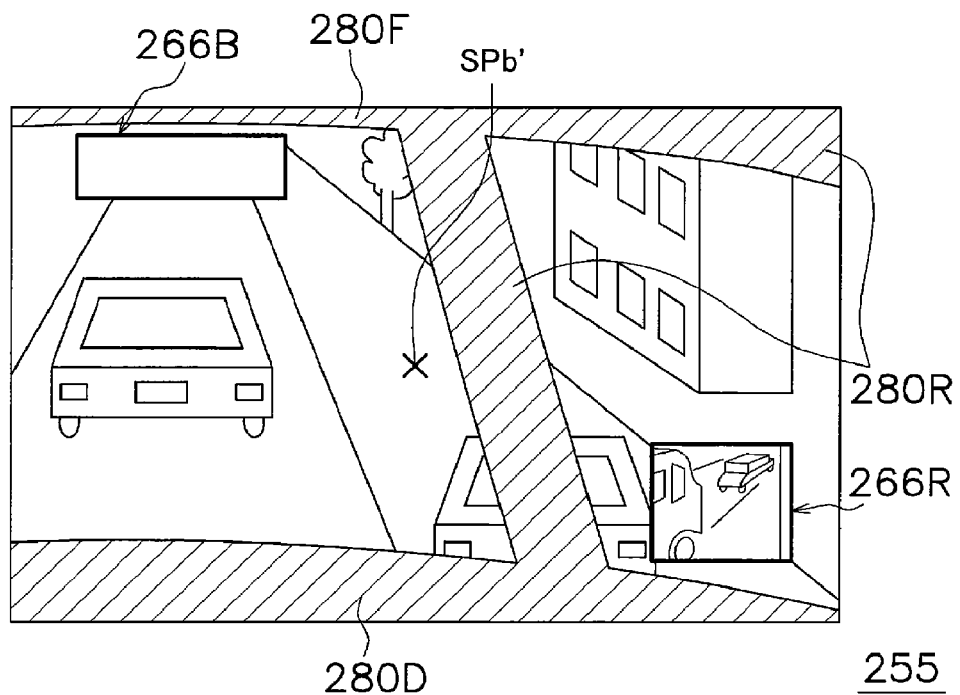
F I G. 2 9

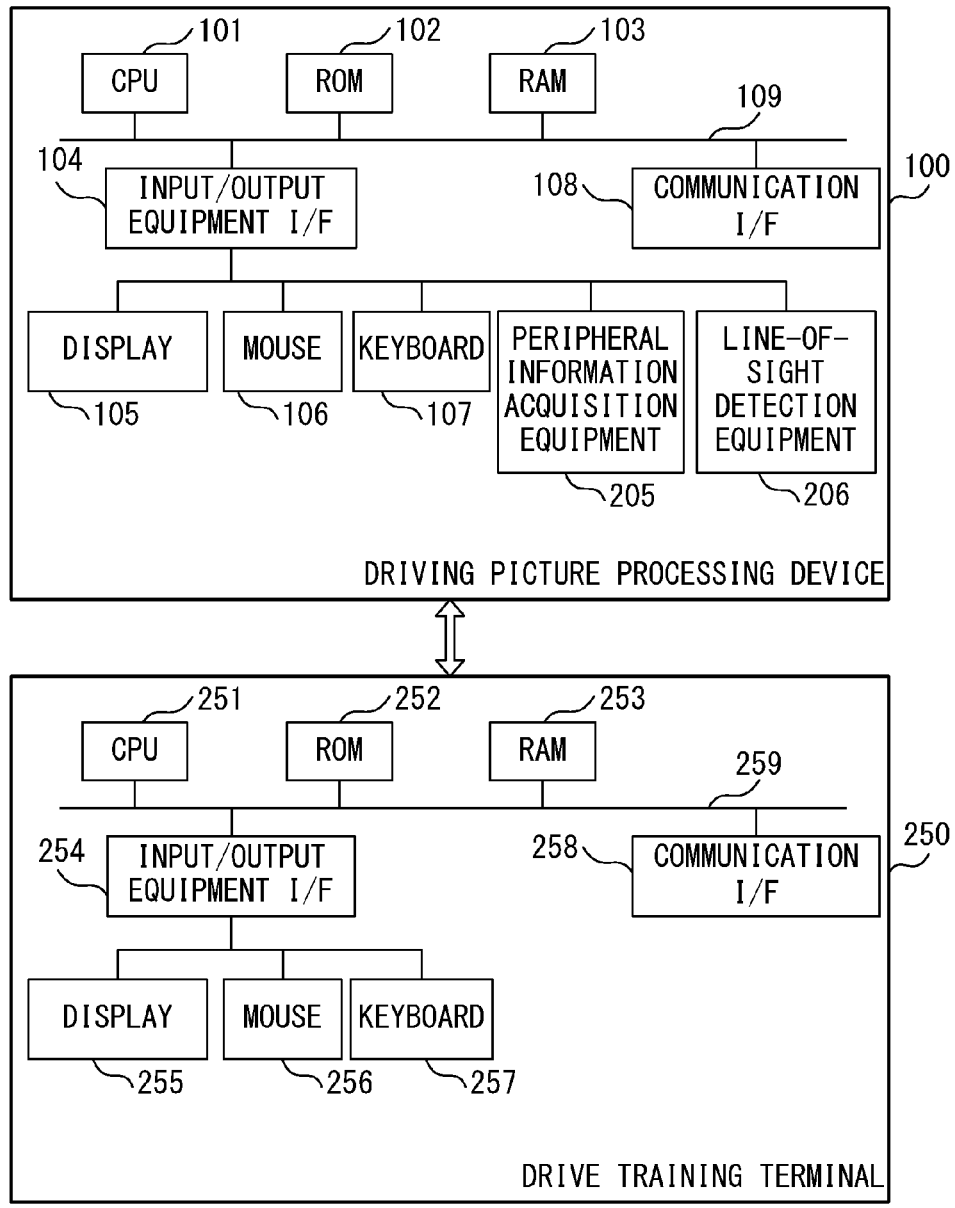
F I G. 3 6

PICTURE PROCESSING DEVICE AND METHOD

CROSS-REFERENCE TO RELATED APPLICATIONS

This application is a continuation of International application No. PCT/JP2010/058774, filed on May 25, 2010, the entire contents of which are incorporated herein by reference.

FIELD

The present invention is related to a picture processing device, a picture processing method, and a picture processing program for generating pictures observed by a driver.

BACKGROUND

In the society dependent on cars, it is an important problem to promote safety and reduce the number of accidents, and various measures are taken to solve the problem. For example, one of the measures is to allow a driver to learn to know using pictures the case in which an accident easily takes place. Concretely, for example, according to the patent document 1, a picture of an accident is acquired using a drive recorder loaded into the vehicle, and the picture of an accident is replayed to effectuate traffic safety education. For example, when the drive recorder detects an impact of a car crash or dangerous driving such as a sudden braking, a sharp turn of the steering wheel, and so on, a view ahead of the driver's vehicle and the driving state of the driver's vehicle are recorded.

However, the picture acquired by the above-mentioned drive recorder is only the view ahead of the vehicle, and the picture which may be confirmed by viewer is also limited to the view ahead of the vehicle. Therefore, for example, when the driver looks at the right or left side, the picture viewed by the viewer is different from the picture actually viewed by the driver.

It is effective for traffic safety education to analyze the cause of the dangerous driving such as what situation the driver has actually observed, what situation observed by the driver has incurred the dangerous driving, and so on.

Patent Document 1: Japanese Laid-open Patent Publication No. 2007-011148

SUMMARY

According to an aspect of the picture processing device of the present invention, the device includes: a picture acquisition unit which acquires the peripheral information including the picture obtained by shooting the periphery of a driver's vehicle; a line-of-sight acquisition unit which acquires the line-of-sight origin and the direction of the line of sight of a driver of the driver's vehicle; a line-of-sight picture generation unit which generates from the peripheral information a line-of-sight picture corresponding to the line-of-sight origin; a cutoff information calculation unit which calculates the cutoff information including the car body area or the car body picture of the driver's vehicle which cuts off the line of sight of the driver based on the line-of-sight origin; and a display picture generation unit which generates a display picture according to the line-of-sight picture and the cutoff information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an example of the connection among the driving picture processing device, the information acquisition device, and the drive training terminal according to the first embodiment of the present invention;

FIG. 4 is an explanatory view of the attaching position of the line-of-sight detection equipment;

Figure 9:
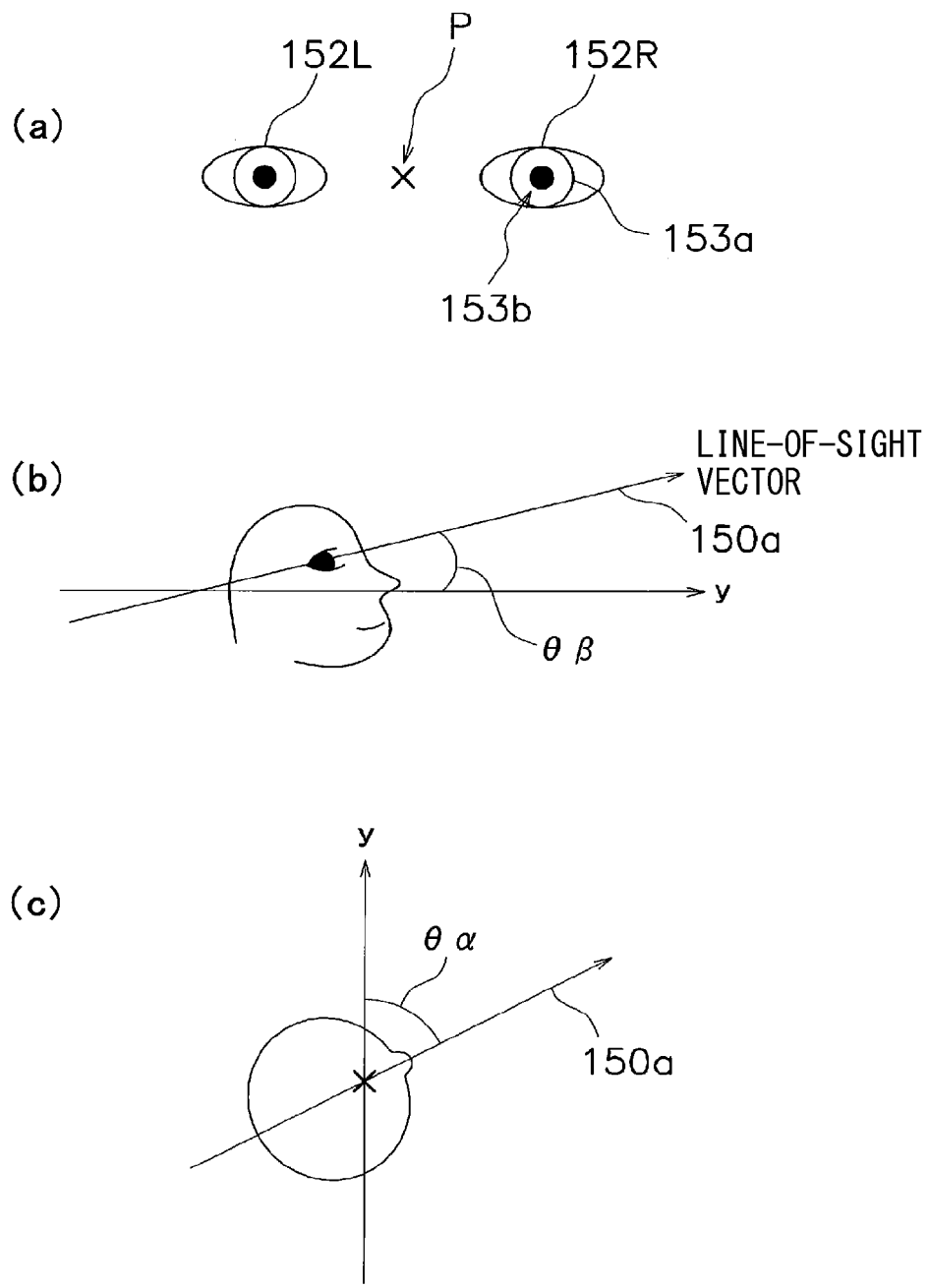
Figure 12:
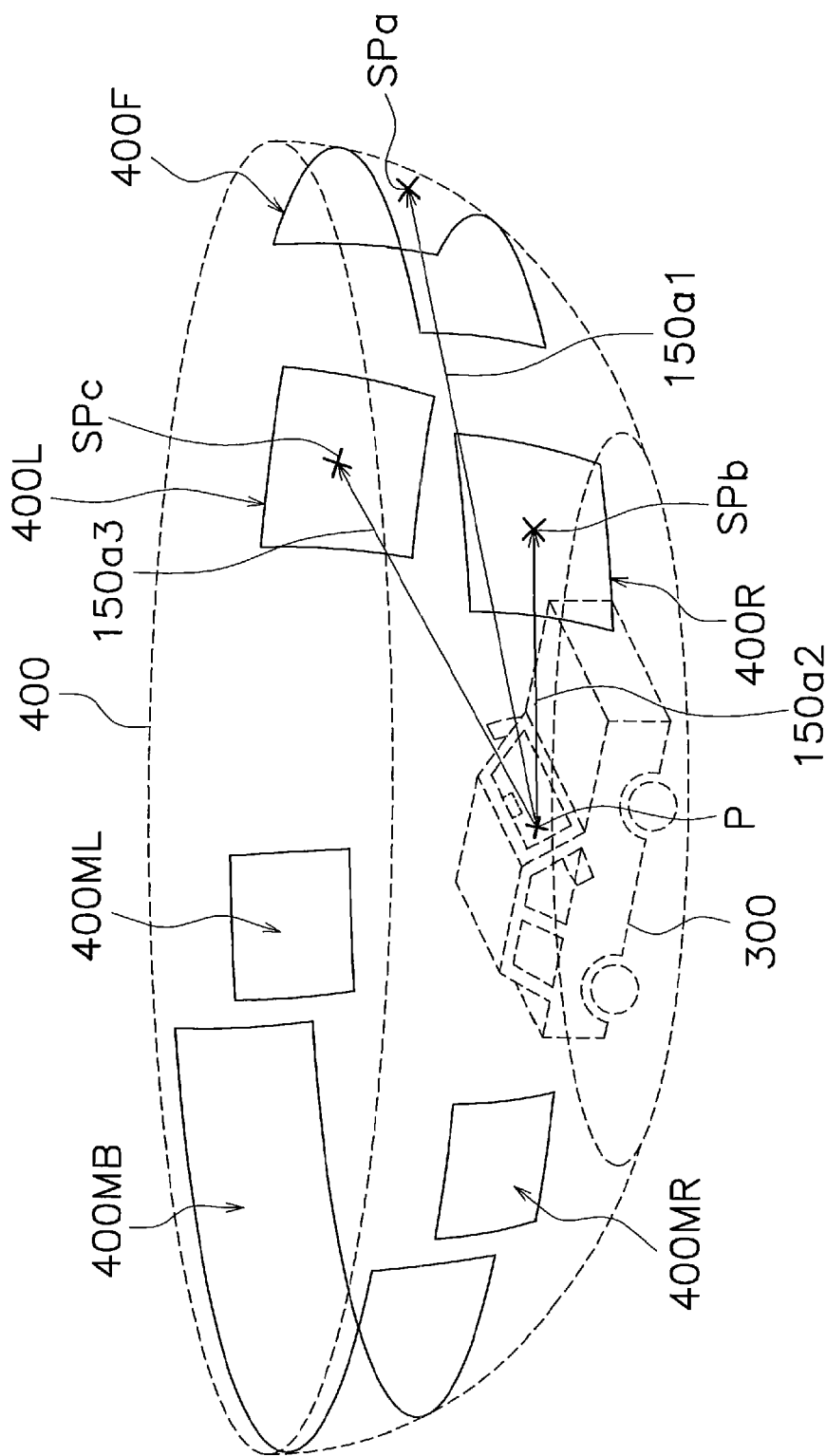
Figure 15:
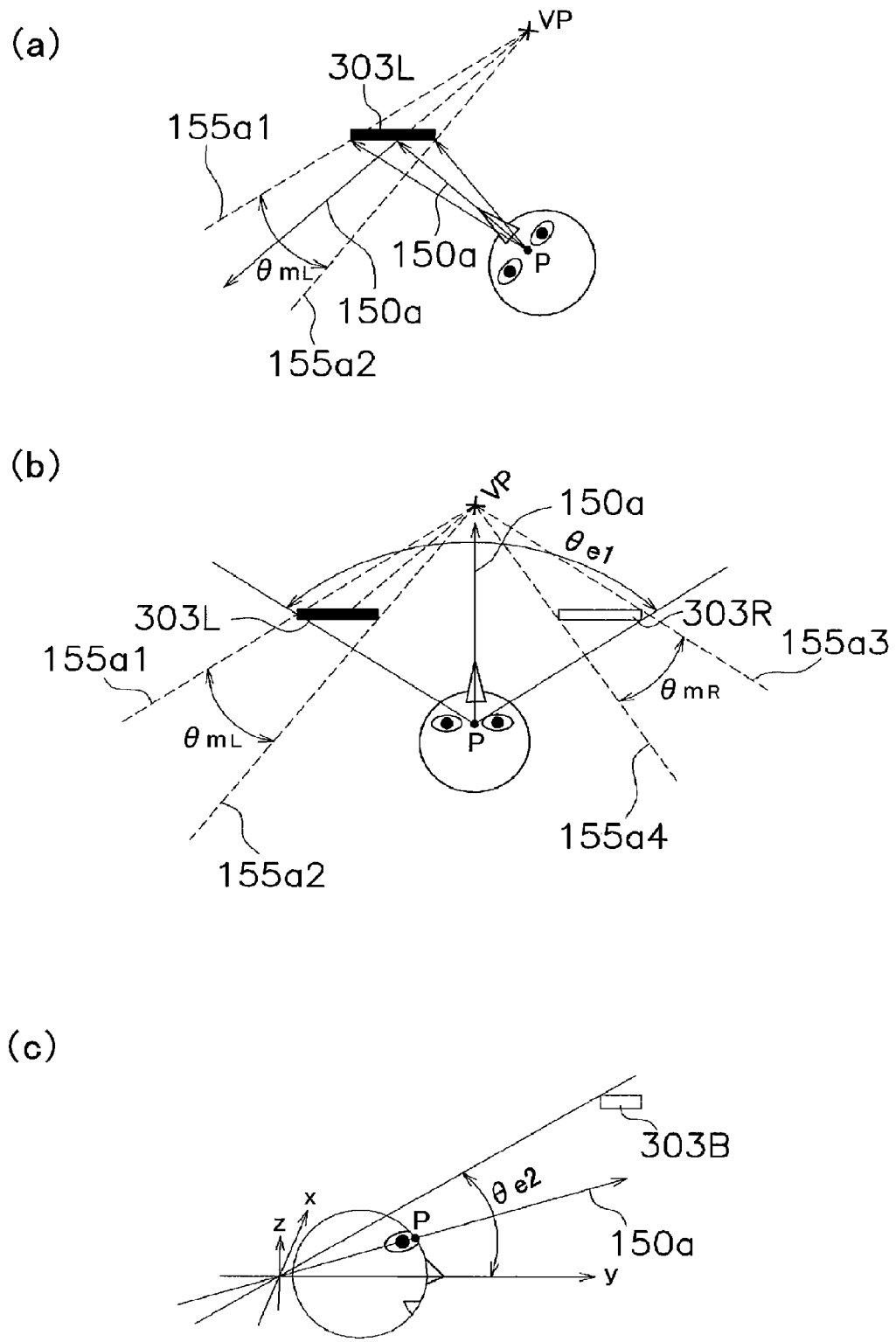
Figure 17:
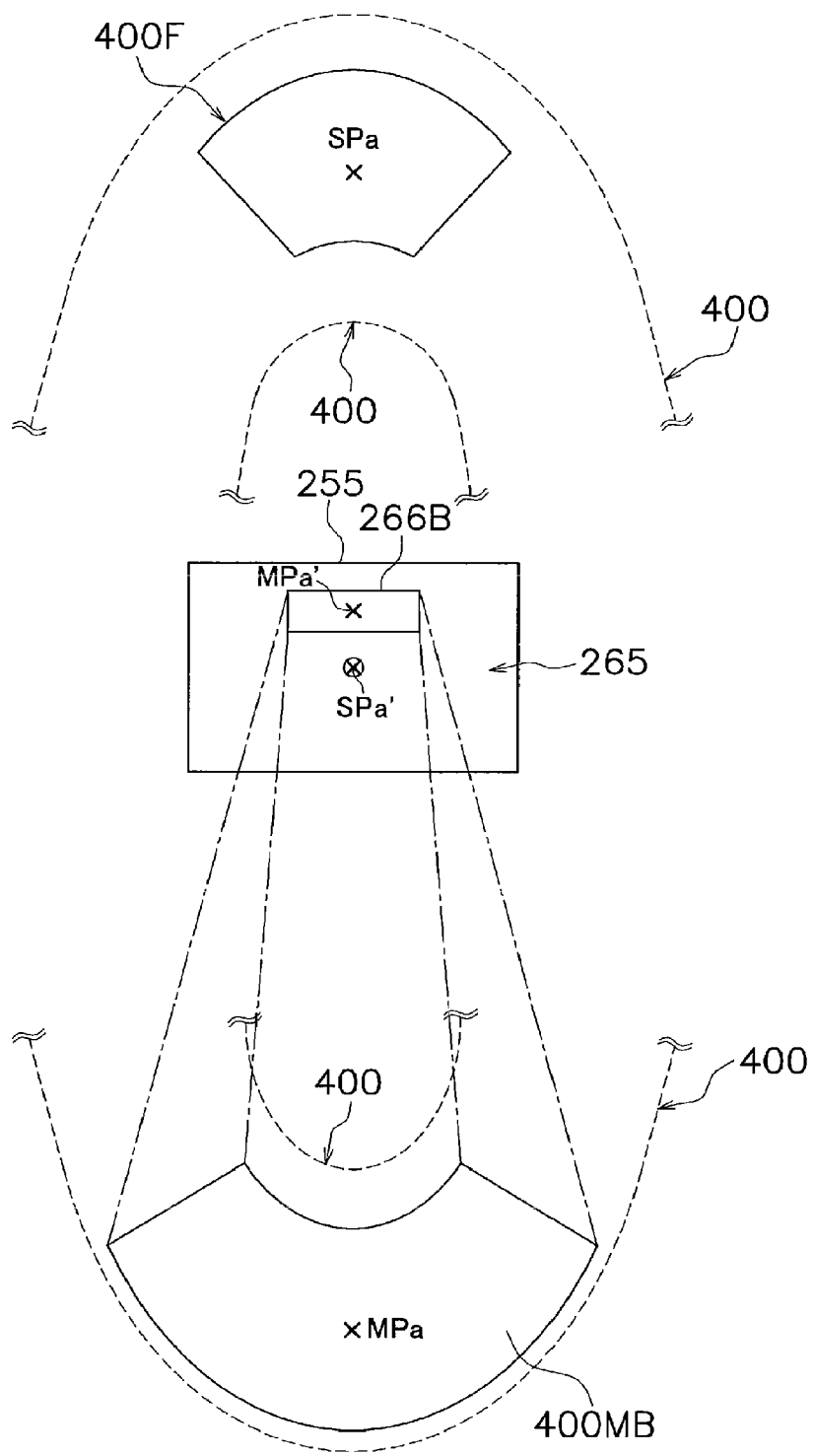
Figure 18:
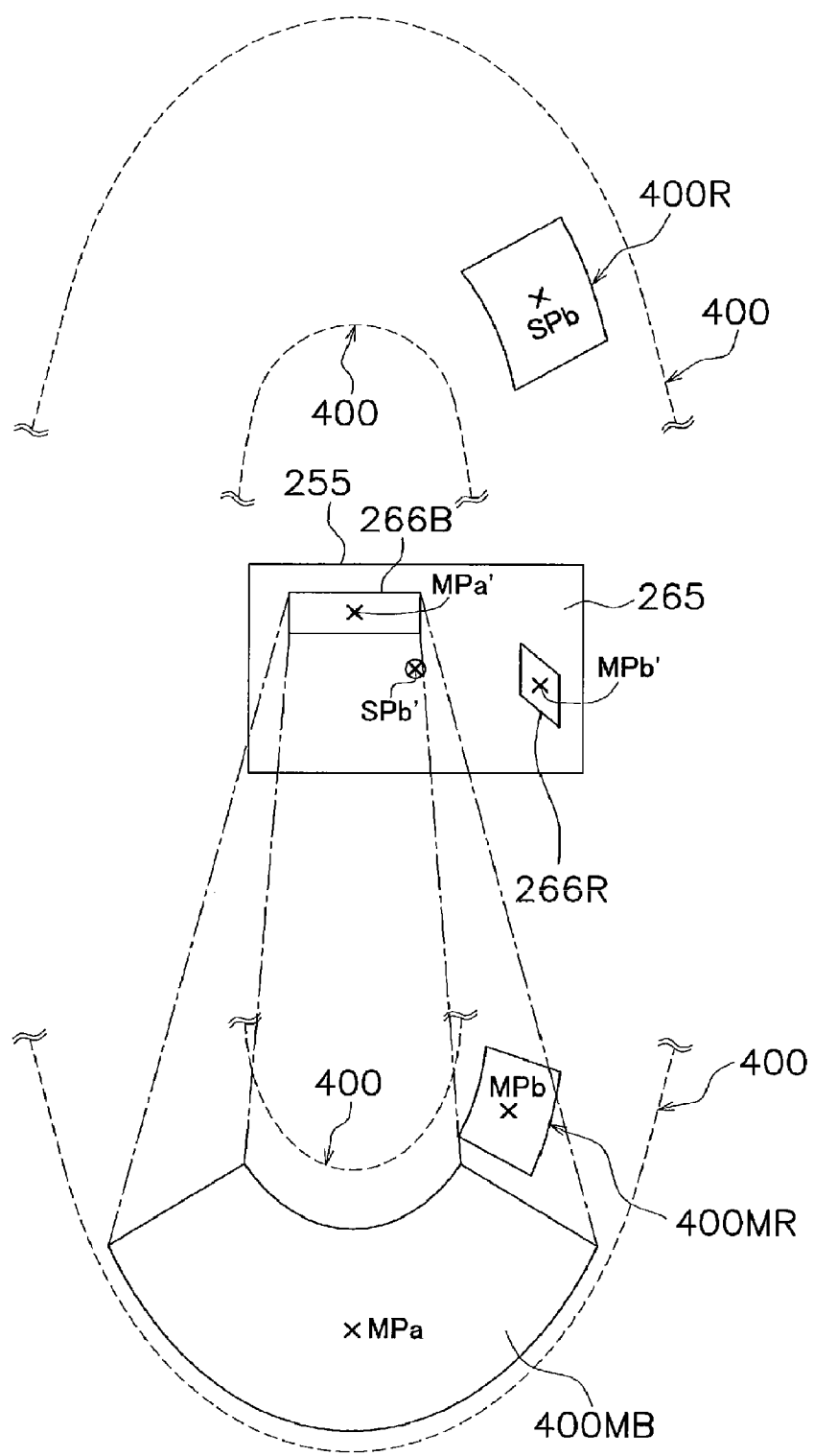
Figure 19:
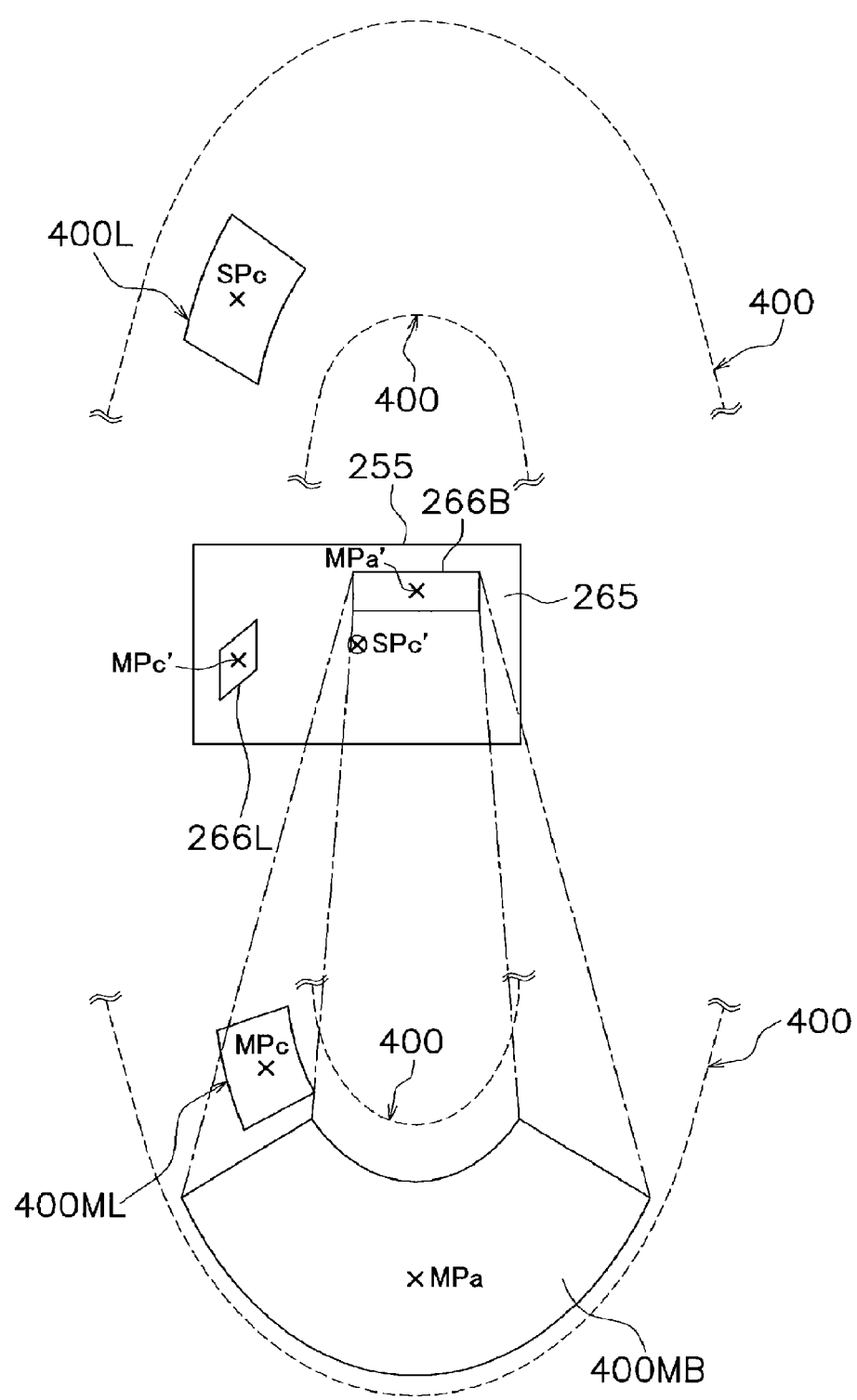
Figure 24:
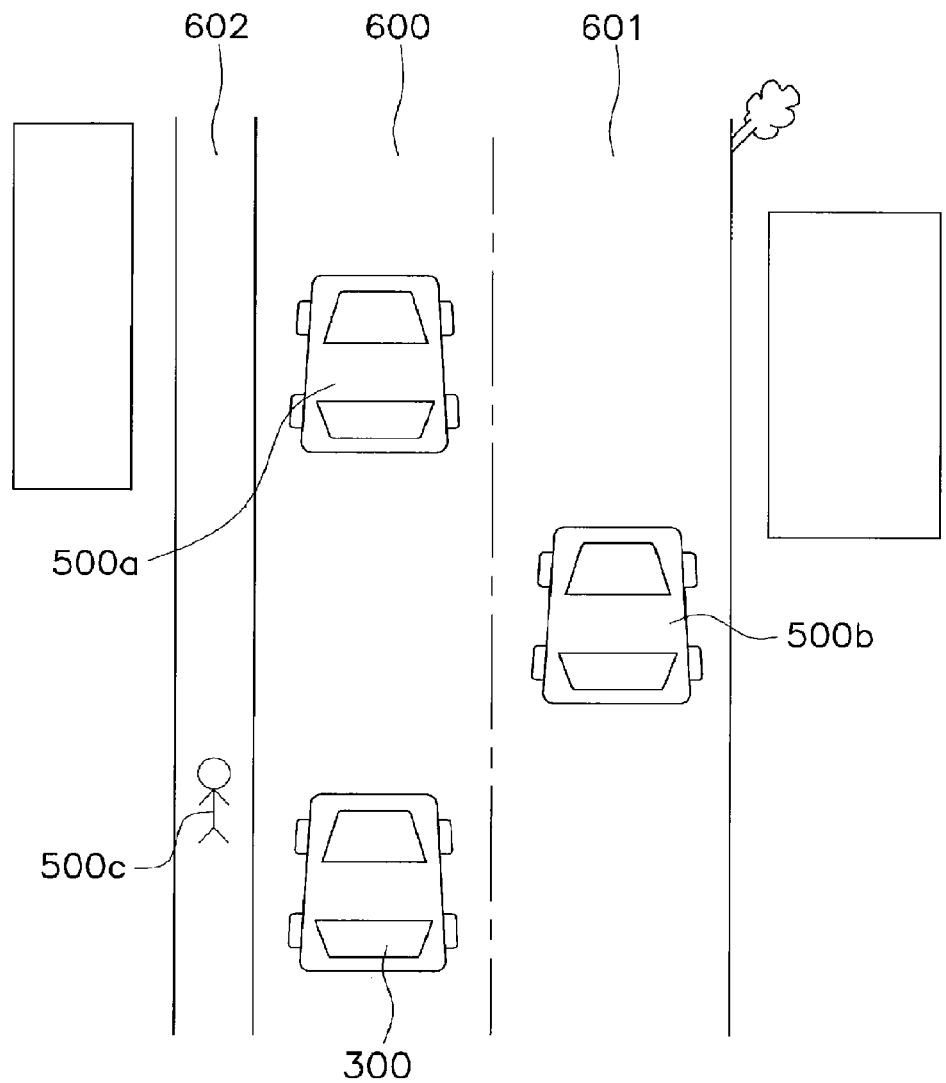
Figure 27:
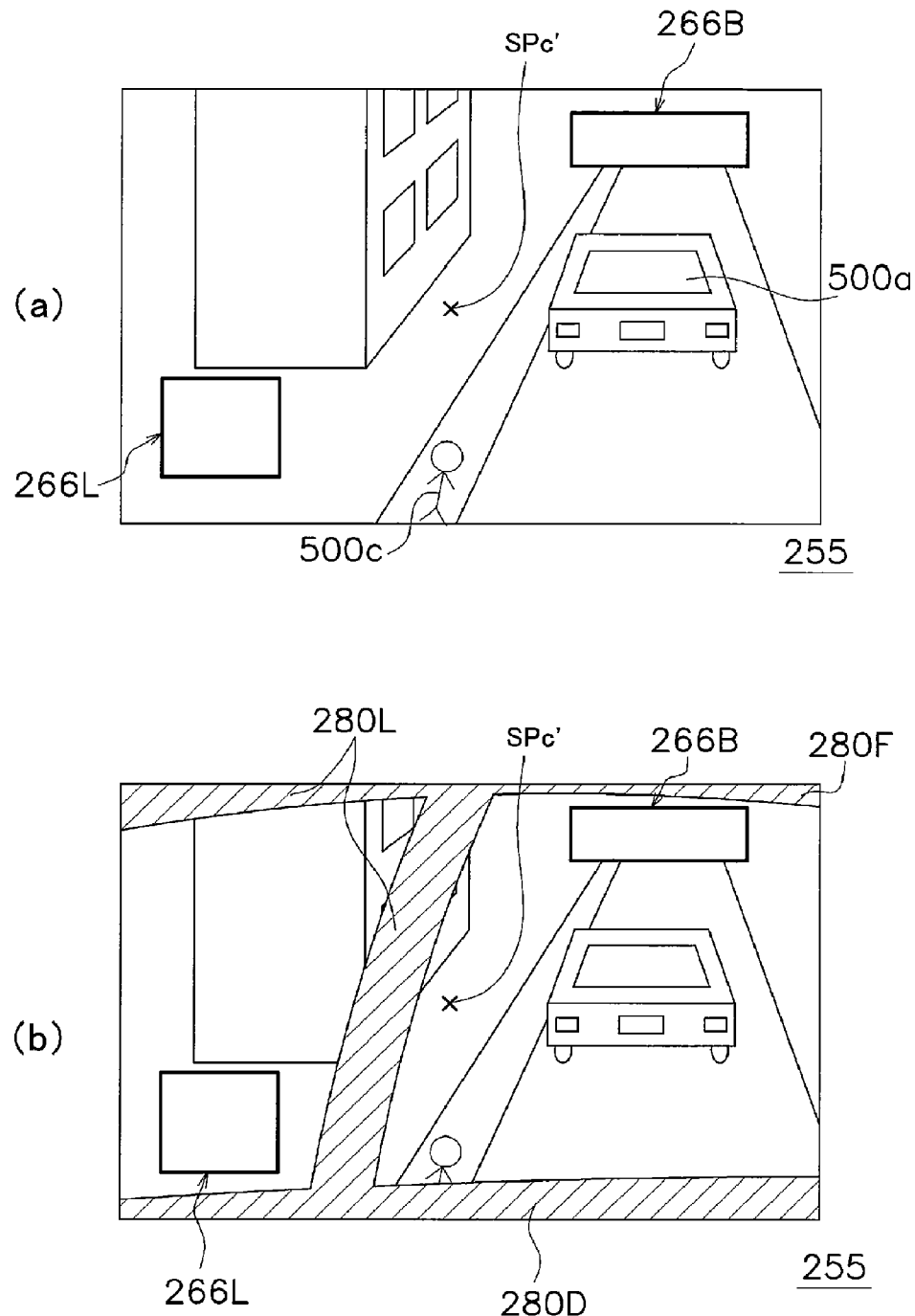
Figure 28:
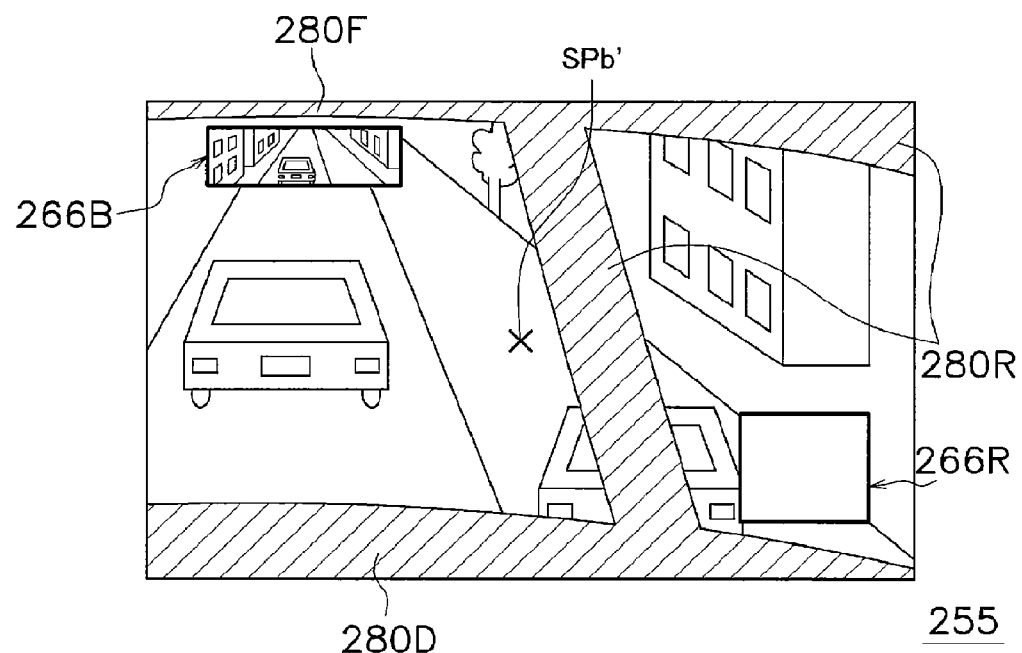
Figure 30:
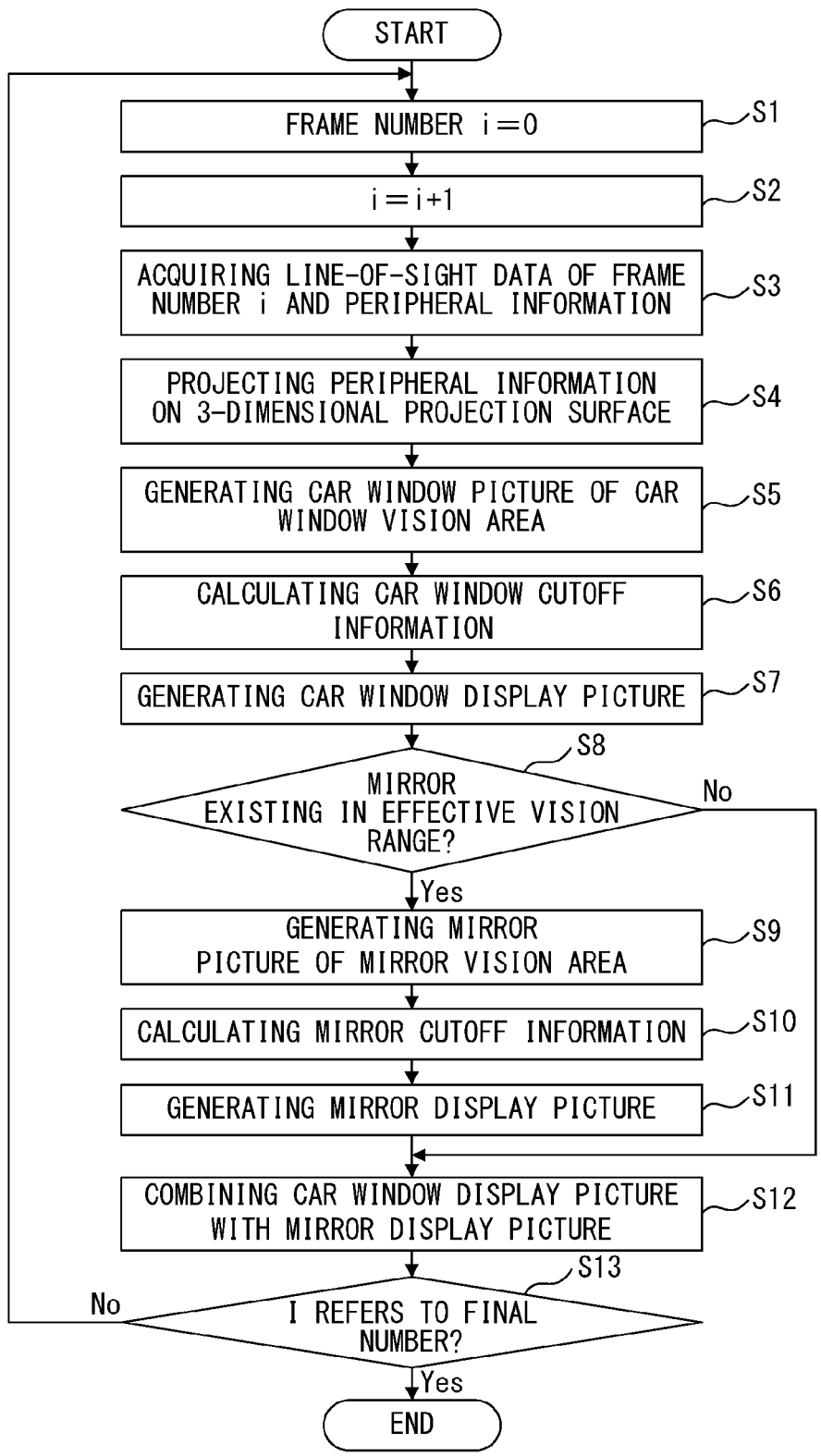
Figure 31:
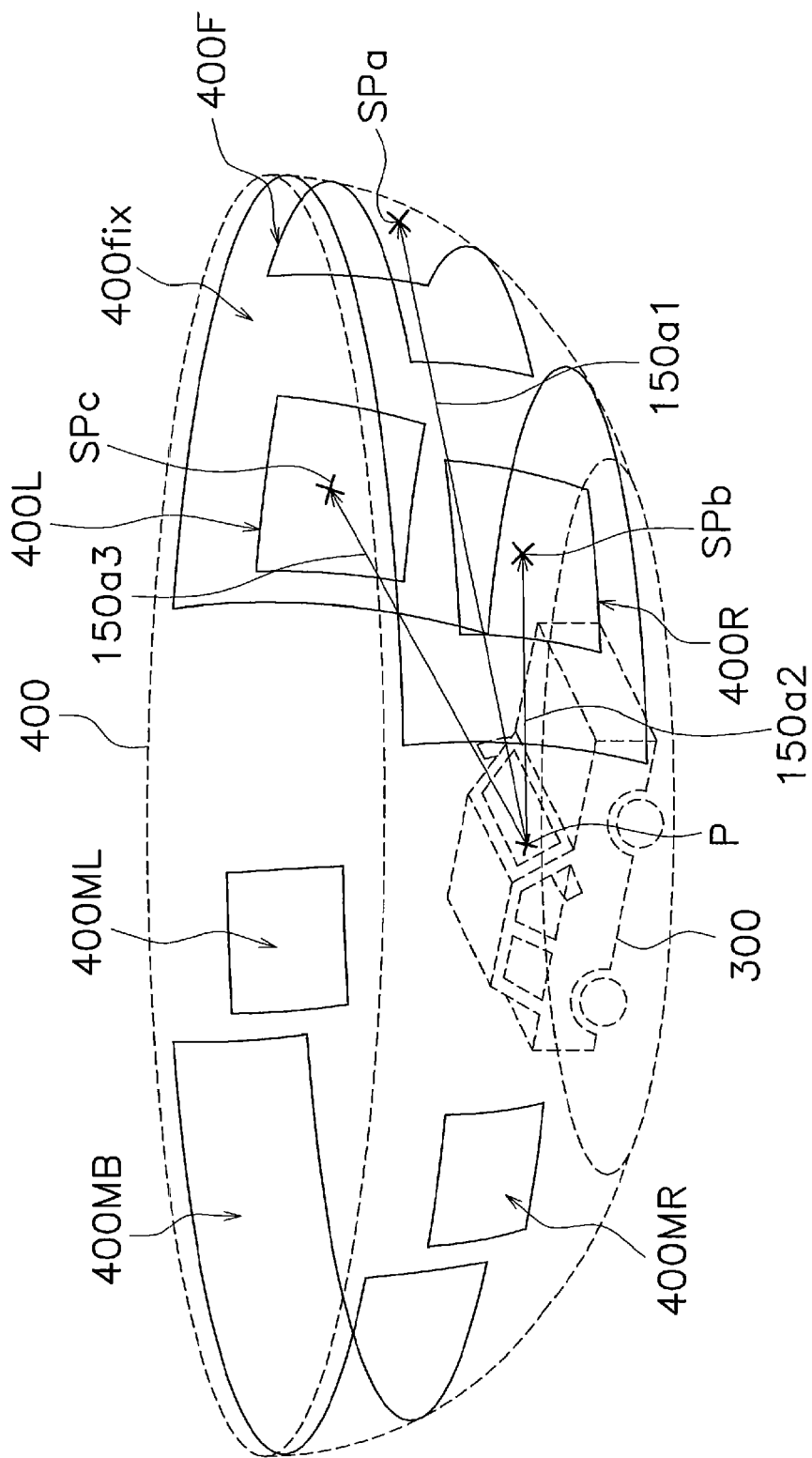
Figure 32:
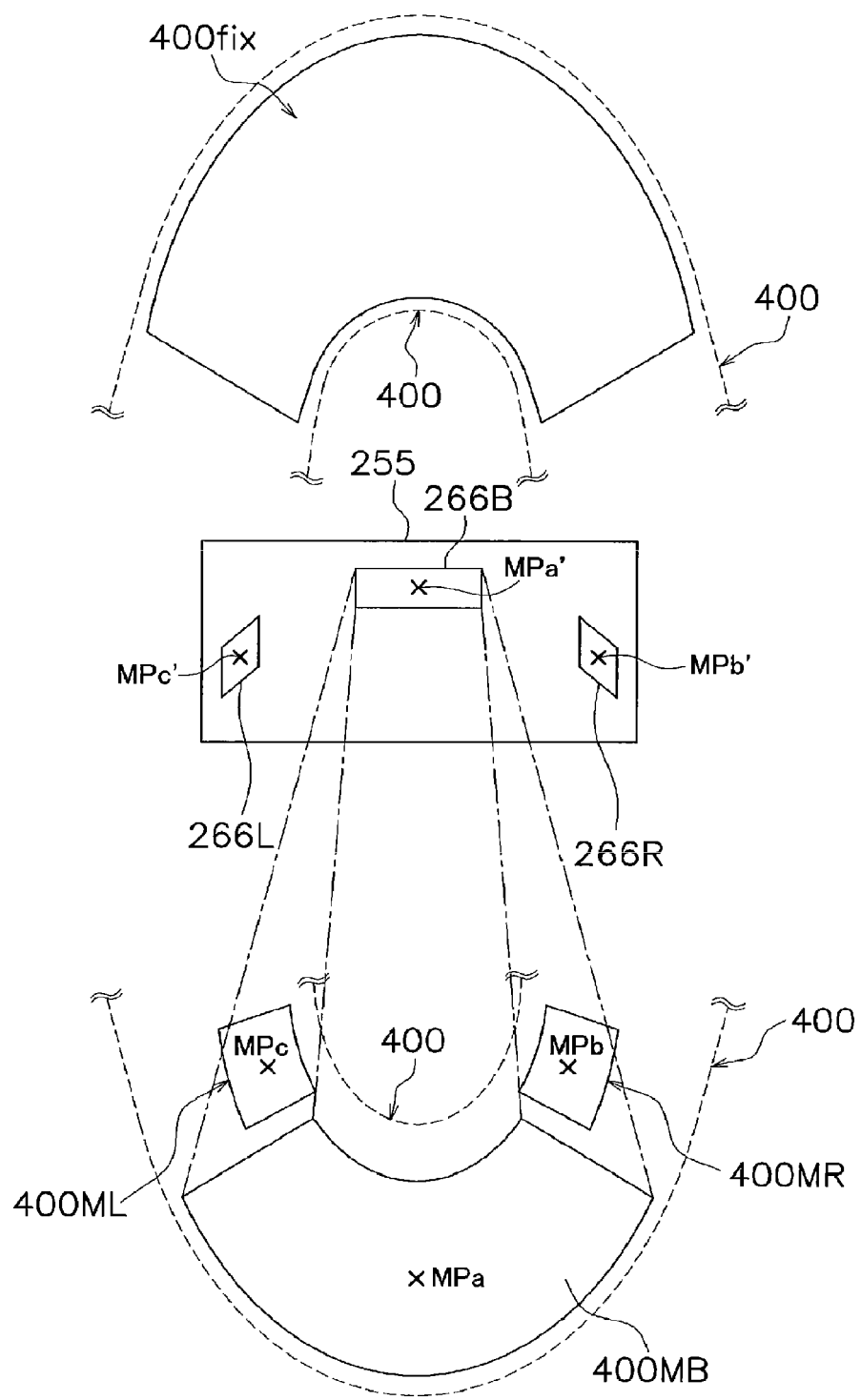
Figure 33:
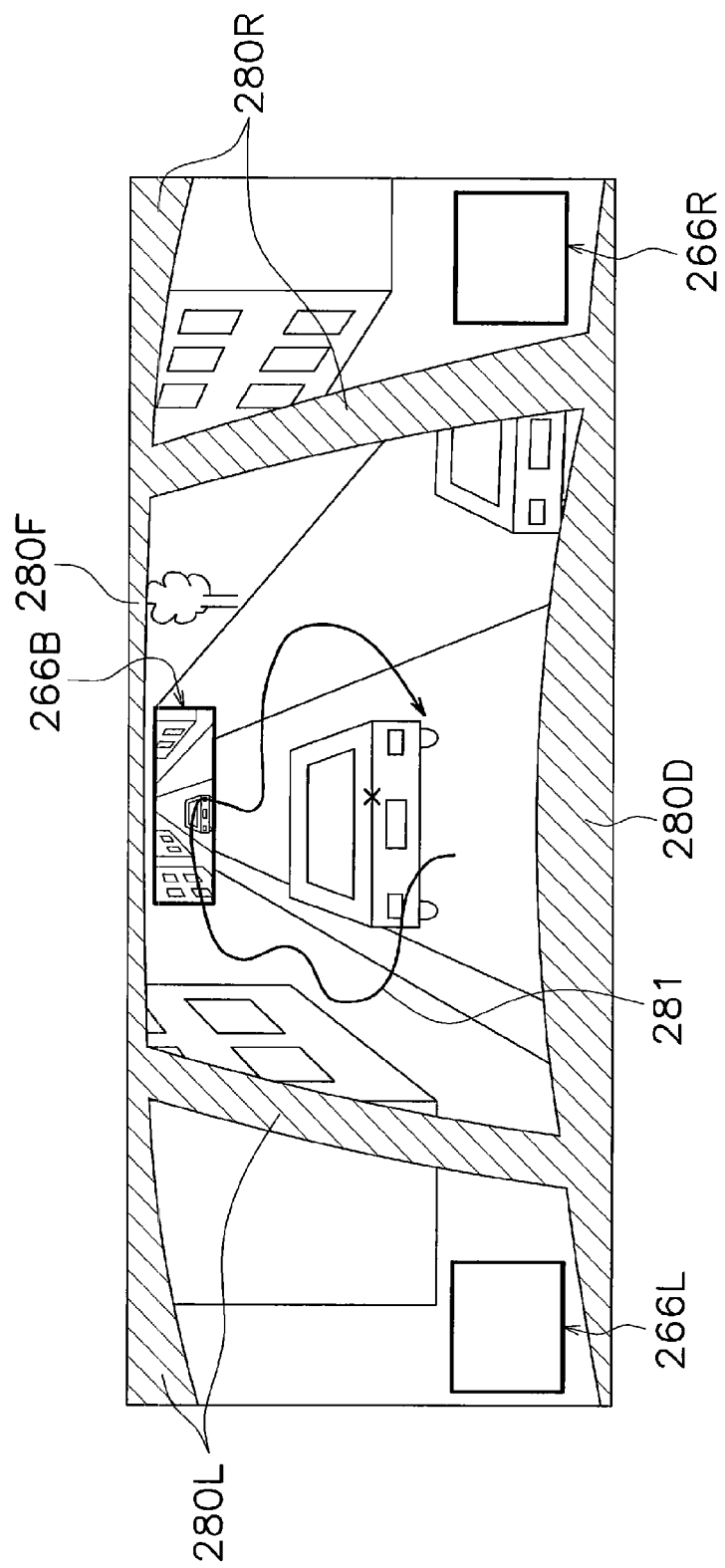
Figure 34:
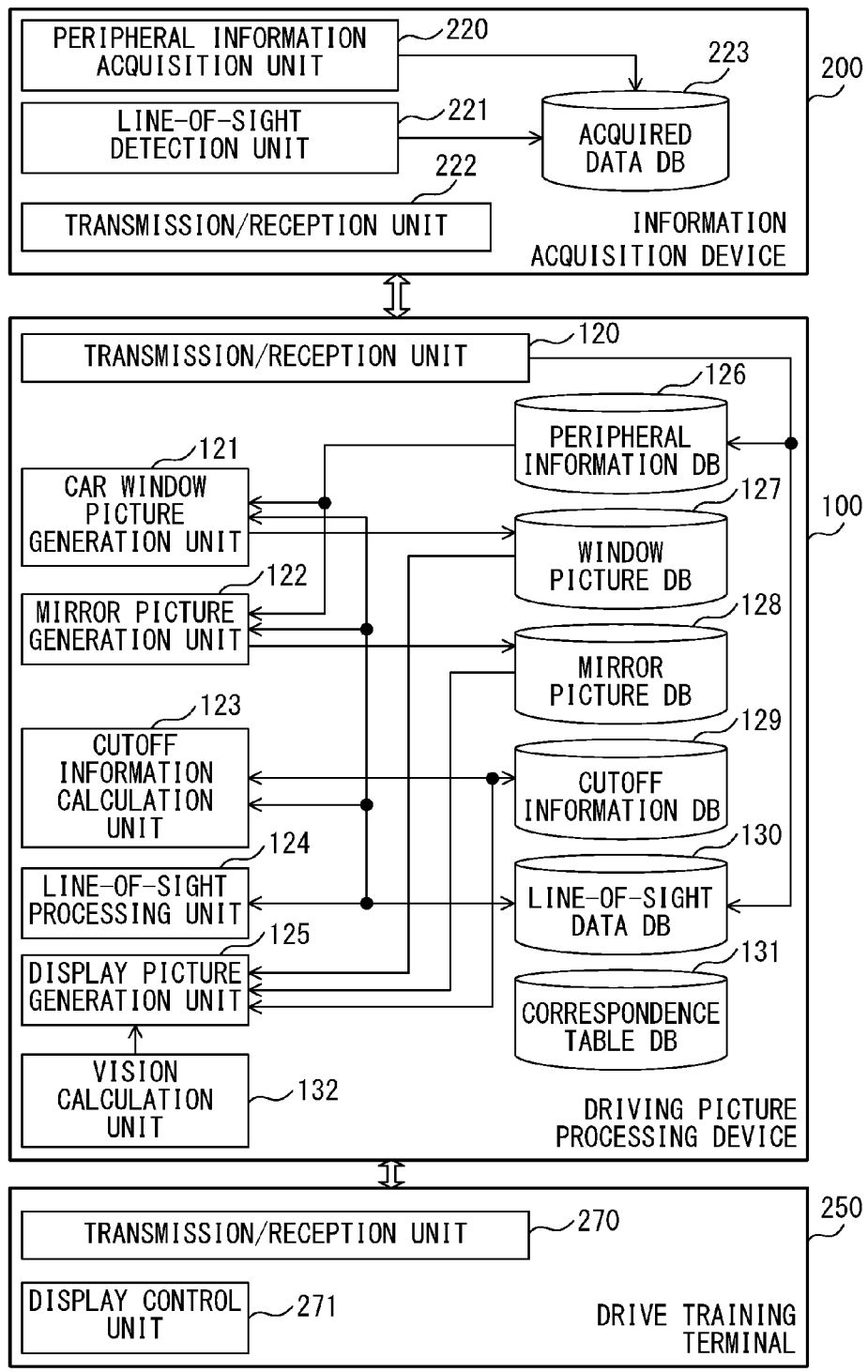
Figure 35:
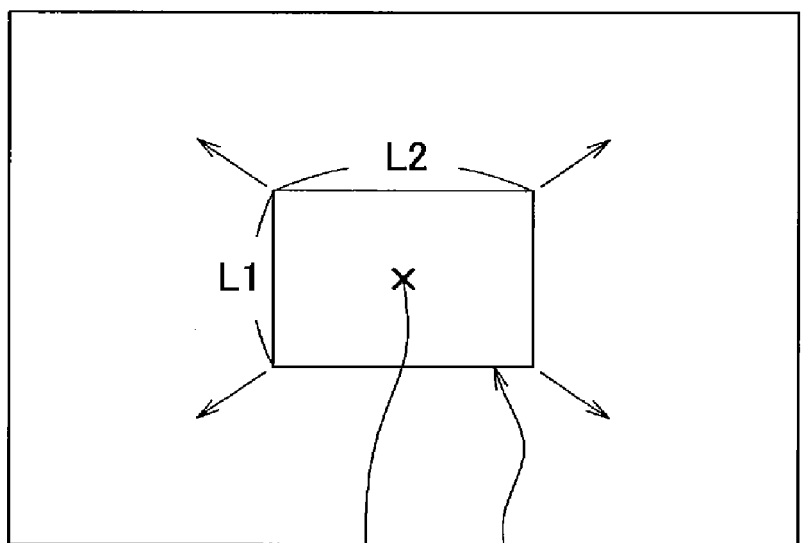
Figure 37:
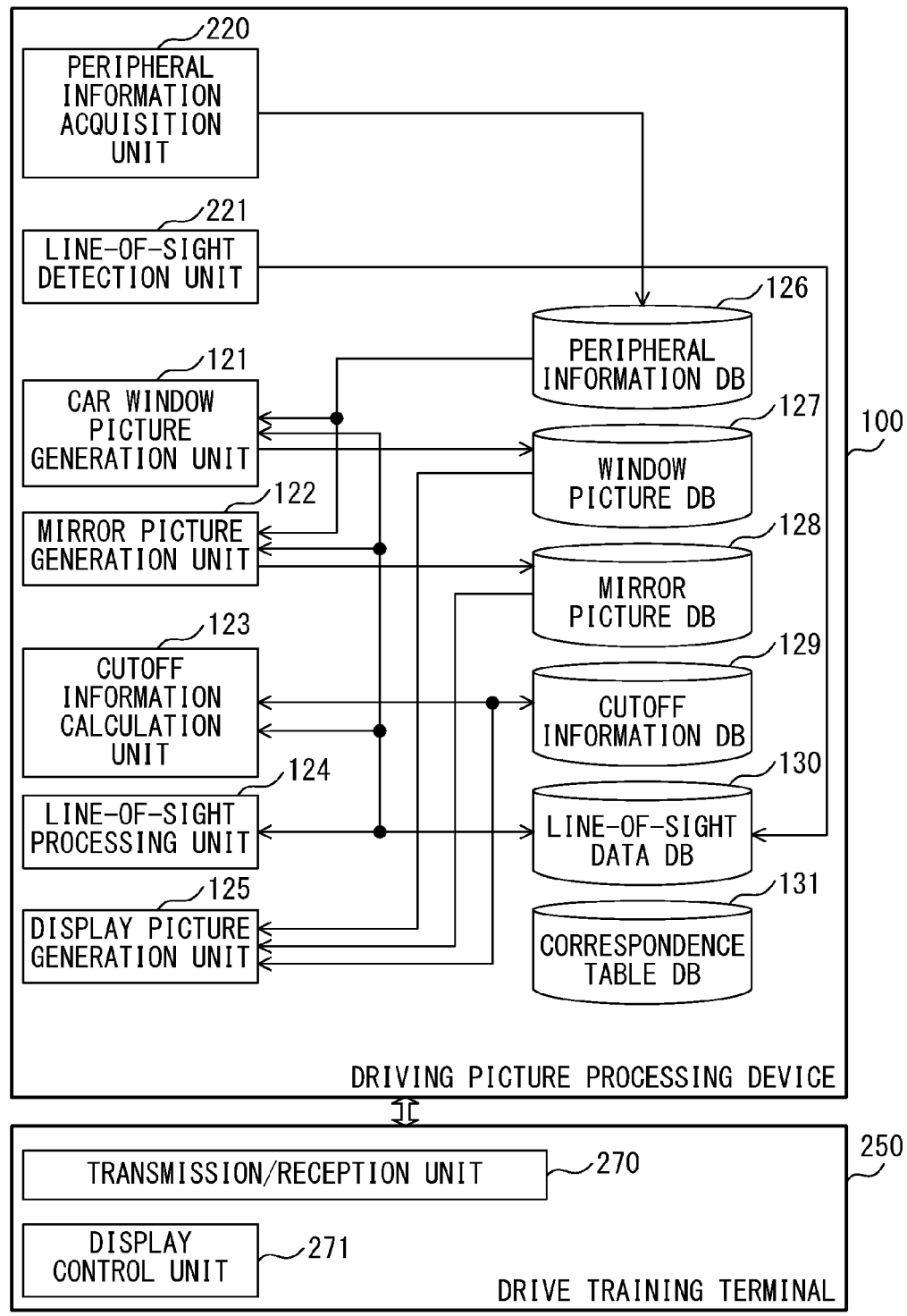

Part (a) of FIG. 9 is an explanatory view (1) of an example of a method of calculating the line-of-sight origin P and the line-of-sight vector, part (b) of FIG. 9 is an explanatory view of the pitch angle $\theta\beta$, and part (c) is an explanatory view of the azimuth $\theta\alpha$;

FIG. 10 is an example of peripheral information DB;

FIG. 11 is an example of line-of-sight data DB;

FIG. 12 is an explanatory view (1) of the relationship between the effective vision range and the mirror, and the visual mirror confirmation range which may be visually confirmed through a mirror, an explanatory view (2) of the relationship between the effective vision range and the mirror, and the visual mirror confirmation range which may be visually confirmed through the mirror, and an explanatory view (3) of the relationship between the effective vision range and the mirror, and the visual mirror confirmation range which may be visually confirmed through the mirror;

FIG. 13 is an example of the association between the line-of-sight origin p and the line-of-sight vector, and the car window vision area on the 3-dimensional projection surface;

FIG. 14 is an example of the association between the line-of-sight origin P and the line-of-sight vector, and the car window cutoff information;

FIG. 15 is an explanatory view of the relationship between the effective vision range and the mirror, and the visual mirror confirmation range which may be visually confirmed through the mirror;

FIGS. 16A and 16B are an example of the association for each car model among the mirror information, the line-of-sight origin P, the virtual line-of-sight origin VP, the mirror vision field angle $\theta m$, the mirror vision area, and the mirror cutoff information;

FIG. 17 is an explanatory view (1) of the relationship between the car window picture and the mirror picture, and the display area of the display on the 3-dimensional projection surface;

FIG. 18 is an explanatory view (2) of the relationship between the car window picture and the mirror picture, and the display area of the display on the 3-dimensional projection surface;

FIG. 19 is an explanatory view (3) of the relationship between the car window picture and the mirror picture, and the display area of the display on the 3-dimensional projection surface;

FIG. 20 is an example of the association between the line-of-sight origin P and the line-of-sight vector, and each mirror display area;

FIG. 21 is an example of a car window picture DB;

FIG. 22 is an example of a mirror picture DB;

FIG. 23 is an example of cutoff information DB;

FIG. 24 is an example of a picture used as a car window display picture;

Part (a) of FIG. 25 is a car window picture including another vehicle and a walker when the driver looks ahead, and part (b) is a car window display picture obtained by combining the car window cutoff information with the car window picture in (a);

Part (a) of FIG. 26 is a car window picture including another vehicle and a walker when the driver looks diagonally right ahead, and part (b) is a car window display picture obtained by combining the car window cutoff information with the car window picture in (a);

Part (a) of FIG. 27 is a car window picture including another vehicle and a walker when the driver looks diagonally left ahead, and part (b) is a car window display picture obtained by combining the car window cutoff information with the car window picture in (a);

FIG. 28 is an example of a display picture obtained by superposing a back mirror picture on a back mirror display area 266B in part (b) of FIG. 26;

FIG. 29 is an example of a display picture obtained by superposing a right mirror picture on a right mirror display area 266R in part (b) of FIG. 26;

FIG. 30 is a flowchart of an example of the flow of the process performed by the driving picture processing device according to the first embodiment;

FIG. 31 is an explanatory view of the positions of the fixed vision area on the 3-dimensional projection surface, and the car window picture and the mirror picture;

FIG. 32 is an explanatory view of the relationship between the car window picture and the mirror picture on the 3-dimensional projection surface, and the display area of the display;

FIG. 33 is an example of a display picture;

FIG. 34 is an example of a block diagram of the functional configuration of each device according to the variation example 2;

FIG. 35 is an explanatory view of an example of processing a display picture;

FIG. 36 is an example of a block diagram of a hardware configuration of the driving picture processing device according to the second embodiment; and FIG. 37 is an example of a block diagram of a functional configuration of the driving picture processing device according to the second embodiment.

DESCRIPTION OF EMBODIMENTS

First Embodiment

A driving picture processing device 100 according to the first embodiment generates a picture actually observed by a driver of a driver's vehicle 300 during driving. For example, the driving picture processing device 100 generates from the peripheral information about the driver's vehicle 300 the line-of-sight picture corresponding to the line-of-sight origin p of the driver of the driver's vehicle 300 and the direction of the line of sight. The peripheral information includes at least the peripheral picture of the driver's vehicle 300, and includes, for example, the picture of an object such as a vehicle in addition to the periphery of the driver's vehicle 300, the road, and so on. Furthermore, the driving picture processing device 100 calculates the cutoff information including the car body area and/or the car body picture of the driver's vehicle 300 which cuts off the line of sight of the driver based on the line-of-sight origin P and the direction of the line of sight of the driver. Next, the driving picture processing device 100 generates the display picture having the line of sight of the driver at the center. Therefore, the driving picture processing device 100 reflects on the display picture the area which the driver has not observed due to the car body, and generates the picture around the driver's vehicle 300 which the driver has actually observed by setting the line of sight of the driver at the center.

The car window line-of-sight direction from the line-of-sight origin P of the driver through the window of the driver's vehicle 300 is included in the direction of the line of sight, and the car window picture corresponding to the line-of-sight origin P and the car window line-of-sight direction are included in the line-of-sight picture. In addition, the driver may confirm the object at the back or the back side of the driver's vehicle 300 through the mirror provided for the driver's vehicle 300. Accordingly, the line-of-sight picture may include the mirror picture corresponding to the visual mirror confirmation range visible for the driver through at least one mirror of the driver's vehicle 300.

The cutoff information includes the car window cutoff information about the body of the driver's vehicle 300 which cuts off the line of sight of the driver in the car window line-of-sight direction and/or the mirror cutoff information about the body of the driver's vehicle 300 which cuts off the mirror line-of-sight of the driver toward the visual mirror confirmation range.

In addition, the display picture includes the car window display picture observed by the driver through the window of the driver's vehicle 300 and/or the mirror display picture observed through at least one mirror. The car window display picture is generated by combining the car window picture with the car window cutoff information, and the mirror display picture is generated by combining the mirror picture with the mirror cutoff information.

Described below are the relationship among the driving picture processing device 100 according to the first embodiment, an information acquisition device 200 which acquires various types of information, and a drive training terminal 250, and the hardware configuration of each component.

Figure 2:
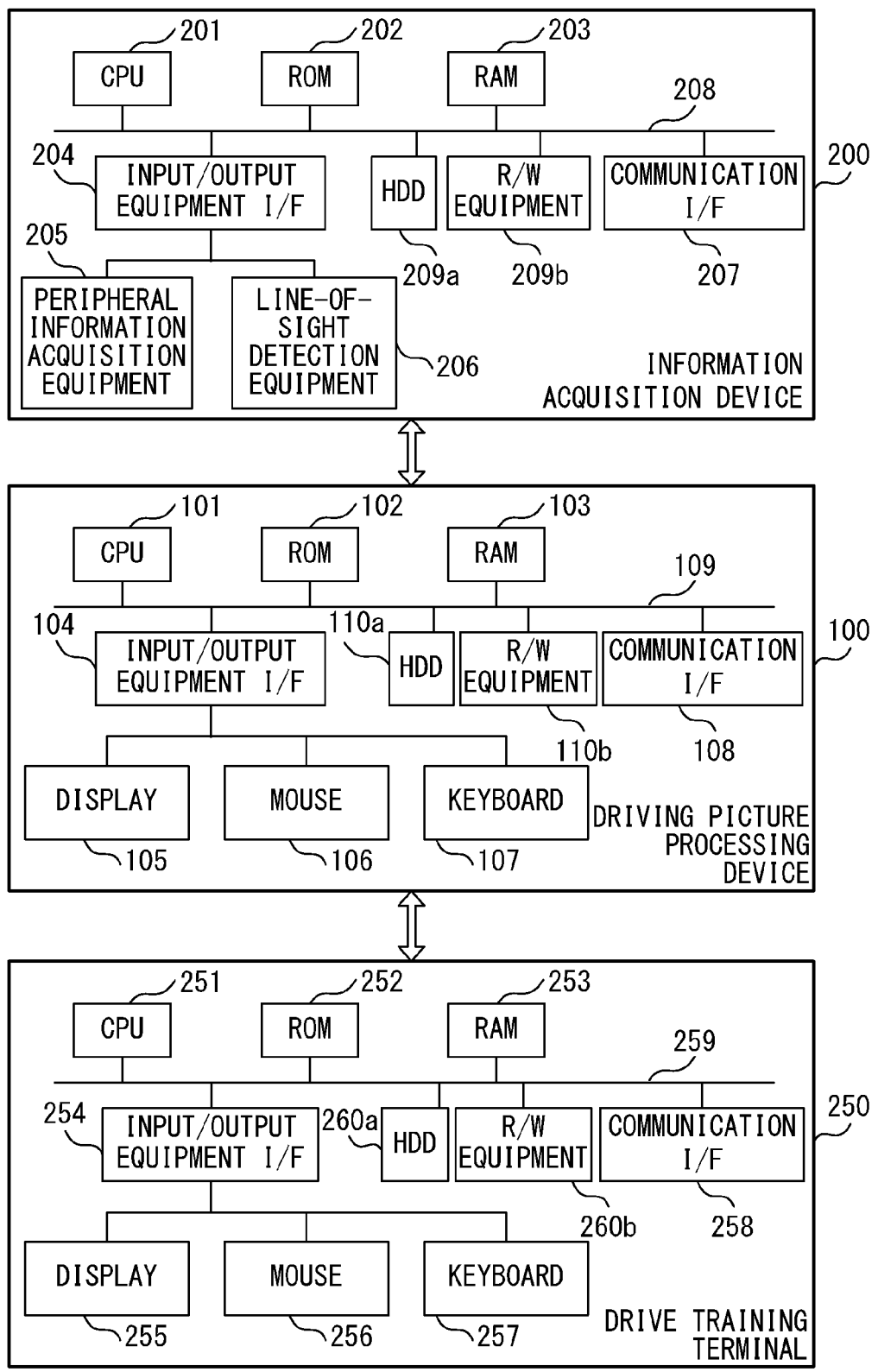
FIG. 2 is an example of a hardware configuration of a driving picture processing device, an information acquisition device, and a drive training terminal.

(1) Relationship Among Driving Picture Processing Device, Information Acquisition Device, and Drive Training Terminal FIG. 1 is an example of the connection among the driving picture processing device, the information acquisition device, and the drive training terminal according to the first embodiment of the present invention. FIG. 2 is an example of a hardware configuration of a driving picture processing device, an information acquisition device, and a drive training terminal.

The driving picture processing device 100 combines the line-of-sight picture corresponding to the line-of-sight origin P and the direction of the line of sight with the cutoff information about the car body of the driver's vehicle 300 which cuts off the line of sight of the driver, and generates a display picture which having the line of sight of the driver at the center. The information acquisition device 200 acquires the peripheral information about the driver's vehicle 300 and various types of information such as the line-of-sight data of the driver of the driver's vehicle 300. The drive training terminal 250 is used by a viewer such as the driver who receives safe drive training to view the display picture generated by the driving picture processing device 100.

The driving picture processing device 100, the information acquisition device 200, and the drive training terminal 250 are connected so that various types of information may be transmitted and received. The connecting method may be, for example, an interface such as an SCSI (small computer system interface), a USB (universal serial bus), and so on, and a network such as the Internet, and so on.

(2) Hardware Configuration (2-1) Driving Picture Processing Device

The driving picture processing device 100 includes, for example, a CPU (central processing unit) 101, ROM (read only memory) 102, RAM (random access memory) 103, input/output equipment I/F 104, a communication I/F (interface) 108, an HDD (hard disk device) 110a, R/W (read/write) equipment 110b. These components are interconnected through a bus 109.

The input/output equipment I/F 104 is connected to an input/output equipment such as a display 105, a mouse 106, a keyboard 107, and so on.

The ROM 102 stores various control programs relating to various types of control described later and performed by the driving picture processing device 100.

The RAM 103 temporarily stores various types of information such as peripheral information and line-of-sight data, and so on acquired from the information acquisition device 200. The RAM 103 also temporarily stores the information such as various flags depending on the execution of each type of control program.

The HDD 110a is an auxiliary storage management device, and stores various types of information such as peripheral information, line-of-sight data, and so on acquired from the information acquisition device 200.

The R/W equipment 110b writes the various types of information to an external storage device, or reads various types of information, programs, and so on stored in an external storage device. The external storage may be an external HDD, a computer-readable recording medium, and so on.

The CPU 101 develops various control programs stored in the ROM 102 on the RAM 103, and perform various types of control described later.

The communication I/F 108 communicates a command or data between, for example, the information acquisition device 200 and the drive training terminal 250 based on the control of the CPU 101.

The bus 109 is configured by, for example, a PCI (peripheral component interconnect) bus, an ISA (industrial standard architecture) bus, and so on, and these components are interconnected.

(2-2) Information Acquisition Device

The information acquisition device 200 includes, for example, a CPU 201, ROM 202, RAM 203, an input/output equipment I/F 204, a communication I/F 207, an HDD 209a, and R/W equipment 209b. These components are interconnected.

(a) Input/Output Equipment I/F

The input/output equipment I/F 204 is connected to a peripheral information acquisition equipment 205, a line-of-sight detection equipment 206, and so on. The information detected by the peripheral information acquisition equipment 205 and the line-of-sight detection equipment 206 is output to the RAM 203, the CPU 201, the communication I/F 207, and so on.

(b) Peripheral Information Acquisition Equipment

The peripheral information acquisition equipment 205 acquires the peripheral information about the periphery of the driver's vehicle 300. In the present embodiment, it is assumed that the peripheral information acquisition equipment 205 acquires the peripheral picture around the driver's vehicle 300. The peripheral picture includes an object, for example, the people, a vehicle, and so on around the driver's vehicle 300, and a road and so on. The peripheral information acquisition equipment 205 includes an image pickup device such as a CCD (charge coupled device) camera, a CMOS (complementary metal oxide semiconductor) camera, and so on.

Figure 3:
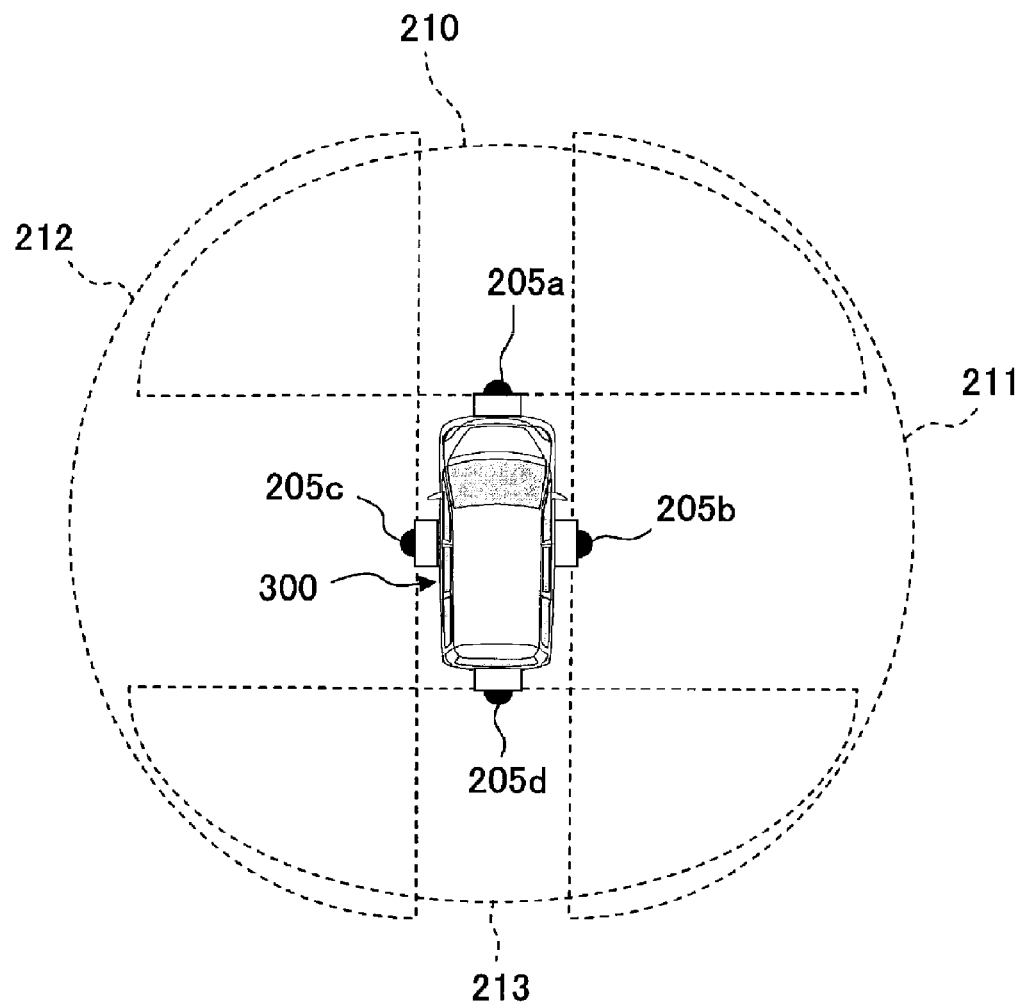
FIG. 3 is an explanatory view of the attaching position and the shooting range of a peripheral information acquisition equipment.

FIG. 3 is an explanatory view of the attaching position and the shooting range of a peripheral information acquisition equipment. The peripheral information acquisition equipment 205 is configured by, for example, four cameras, that is, a forward camera 205a, a right camera 205b, a left camera 205c, and a backward camera 205d as illustrated in FIG. 3. The forward camera 205a is attached to the center of the forward bumper of the driver's vehicle 300, and shoots a forward object of the driver's vehicle 300. The backward camera 205d is attached at the center of the backward bumper of the driver's vehicle 300, and shoots a backward object of the driver's vehicle 300. The right camera 205b is attached at the center of the right of the driver's vehicle 300, and shoots the right side of the driver's vehicle 300. The left camera 205c is attached at the center of the left side of the driver's vehicle 300, and shoots the left side of the driver's vehicle 300.

Each of the cameras 205a through 205d is a camera using a super-wide-angle lens having the angle of view of 180°. Thus, as illustrated in FIG. 3, the forward camera 205a shoots the forward area 210 of the driver's vehicle 300, the right camera 205b shoots a right area 211 of the driver's vehicle 300, the left camera 205c shoots a left area 212, and the backward camera 205d shoots a backward area 213 of the driver's vehicle 300. The shooting area of each of the cameras 205a through 205d is configured so that the area overlaps the area shot by the adjacent cameras.

The attaching position and the attachment angle of each of the cameras 205a through 205d and the characteristics of the camera such as the distortion correction value, the focal distance, and so on of the lens of the camera are corrected, that is, calibrated so that they may be applied to the spatial coordinate system having the center point O of the driver's vehicle 300 as the origin. By performing the calibration, the picture shot by each of the cameras 205a through 205d may be incorporated into the spatial coordinate system. The spatial coordinate system is expressed by the X, Y, and Z coordinates. For example, the center point O is defined by the center of the driver's vehicle 300 which refers to the half values of the width and the length of the driver's vehicle 300, and is expressed by $(X, Y, Z)=(0, 0, 0)$. Y indicates the forward direction, X indicates the direction orthogonal to the forward direction, and Z indicates the direction of the height.

It is preferable that each of the cameras 205a through 205d is attached to the center of each of the front side, the right side, the left side, and the back side of the driver's vehicle 300. However, it is accepted that the shooting area of each of the cameras 205a through 205d partially overlaps the shooting area of the adjacent camera, and the attaching position of each of the cameras 205a through 205d is not specifically limited. For example, the right camera 205b and the left camera 205c may be attached to the left and right door mirrors. In addition, it is accepted that the shooting area of each camera partially overlaps another's and the area around the driver's vehicle 300 may be shot at 360°, and the number of cameras is not limited to four.

Each of the cameras 205a through 205d shoots 30 frames per second. The picture data shot by the peripheral information acquisition equipment 205 configured by the cameras 205a through 205d is stored on the RAM 203 through the input/output equipment I/F 204.

By shooting a picture by each of the cameras 205a through 205d as described above, a picture observed by the driver may be generated.

The peripheral information acquisition equipment 205 does not acquire the peripheral information constantly during the operation, but may record the peripheral information only on a specific occasion such as when the tracing drive is detected upon detection of, for example, dangerous driving.

(c) Line-of-Sight Detection Equipment

The line-of-sight detection equipment 206 detects the line-of-sight information such as the face, eyeball, iris, and so on of a driver.

Figure 5:
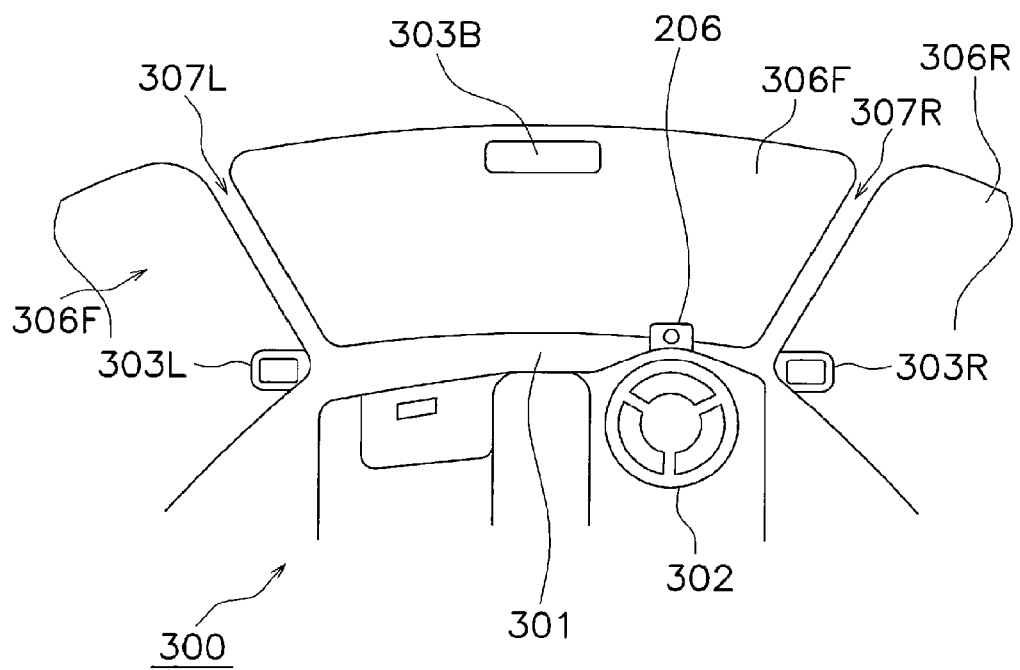
FIG. 5 is an explanatory view of the attaching position of the line-of-sight detection equipment.

FIGS. 4 and 5 are explanatory views of the attaching position of the line-of-sight detection equipment. The line-of-sight detection equipment 206 is configured by an image pickup device such as a CCD camera, a CMOS camera, an infrared camera, and so on which are capable of acquiring the line-of-sight information about the driver.

The line-of-sight detection equipment 206 is provided on, for example, a dashboard 301 of the driver's vehicle 300 as illustrated in FIGS. 4 and 5. In this case, the line-of-sight detection equipment 206 is attached at a specified angle on the dashboard 301 near a handle 302 so that the face, the eyes, and so on of the driver may be detected from the front side and so that the face, the eyes, and so on may be shot without cutoff by the handle 302. However, if the face, the eyes, and so on of the driver are detected, the attaching position, the attachment angle, and so on are not restricted.

The characteristics of the line-of-sight detection equipment such as the attaching position, the attachment angle, and so on of the line-of-sight detection equipment 206 are corrected, that is, calibrated so that the characteristics may be applied to the spatial coordinate system in which the center point O of the driver's vehicle 300 is an origin.

The line-of-sight detection equipment 206 shoots 30 picture frames per second, and the shot picture data is stored on the RAM 203 through the input/output equipment I/F 204.

A line-of-sight 150 may be detected based on the picture of the face, the eyeball, the iris, and so on of the driver detected by the line-of-sight detection equipment 206. If the line-of-sight 150 of the driver is detected, the direction in which the driver has visually confirmed is known.

Figure 6:
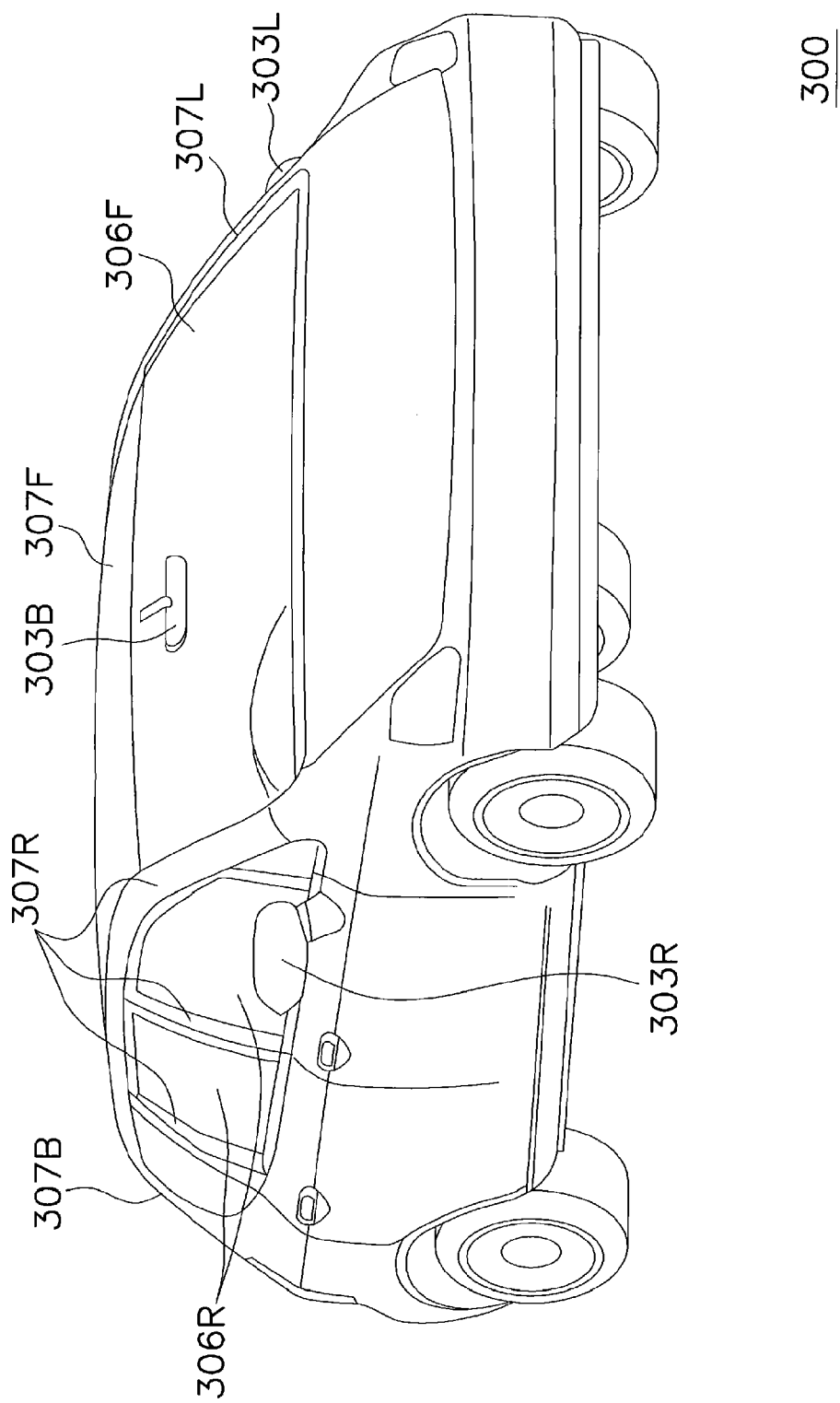
FIG. 6 is an example of the appearance of a vehicle.

As illustrated in FIGS. 4, 5, and 6, a vehicle is configured by a car body structure such as the dashboard 301, the handle 302, windows, mirrors, pillars, and so on. FIG. 6 is an example of the appearance of a vehicle. The driver's vehicle 300 has windows such as a front window 306F, a right window 306R, a left window 306L, a back window (not illustrated in the attached drawings), and so on, and each window is supported by pillars. The pillars are, for example, a front pillar 307F located above the front window 306F, a right pillar 307R and a left pillar 307L located at the right and left of the front window 306F, a back pillar 307B at the back of the car body, and so on.

In addition, a vehicle 303 provided for the driver's vehicle 300 may be door mirrors 303L and 303R attached near the left and right doors of the driver's vehicle 300, a back mirror 303B provided in the driver's vehicle 300, a fender mirror provided on the hood of the driver's vehicle 300 as illustrated in FIGS. 5 and 6, and so on.

Figure 7:
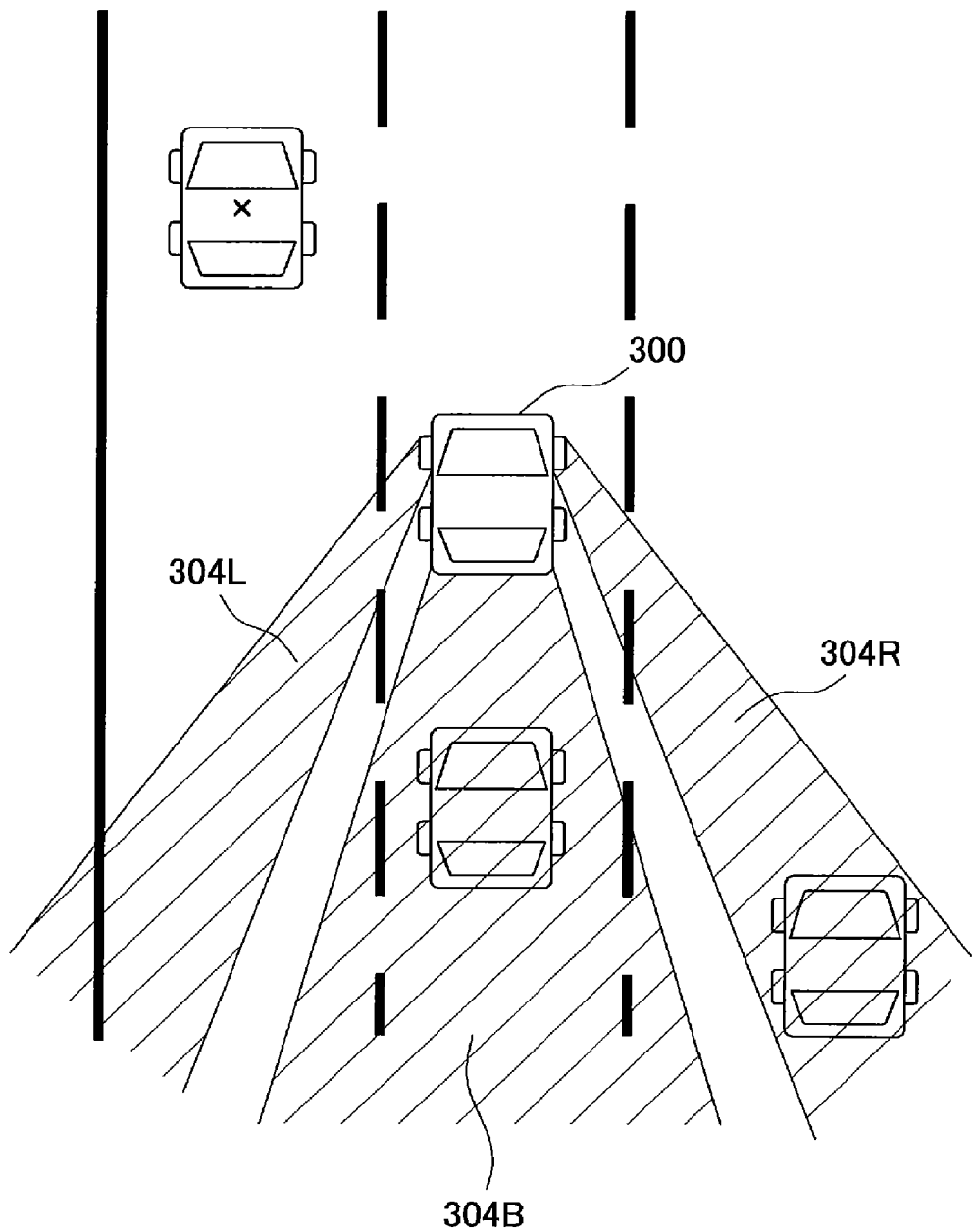
FIG. 7 is an explanatory view of an example of the area which may be confirmed by a mirror.

It is estimated that, for example, the driver has visually confirmed the periphery of the driver's vehicle 300 through the front window 306F if the detected direction of the line-of-sight 150 is the forward direction. In addition, if the direction of the line-of-sight 150 is headed for the mirror 303, it is estimated that the driver has visually confirmed in the backward and diagonally backward directions through the mirror 303. FIG. 7 is an explanatory view of an example of the area which may be confirmed by the mirrors. The driver of the driver's vehicle 300 may view a left mirror area 304L through the left door mirror 303L. The driver may also view a right mirror area 304R through the right door mirror 303R. The driver may also view a back mirror 304B through the back mirror 303B.

(d) ROM, RAM, HDD, R/W Equipment, Communication I/F

The ROM 202 stores various control programs executed by the information acquisition device 200.

The RAM 203 temporarily stores various control programs in the ROM 202, various flags, and various types of information received from the peripheral information acquisition equipment 205 and line-of-sight detection equipment 206.

The communication I/F 207 transmits and receives data such as peripheral information, line-of-sight data, various commands, and so on to and from the driving picture processing device 100 under the control of the CPU 201.

The HDD 209a is an auxiliary storage device, and stores various types of information acquired by the information acquisition device 200.

The R/W equipment 209b writes the various types of information to an external storage device, or reads various types of information and programs stored on the external storage device. The external storage device may be, for example, an external HDD and a computer readable recording medium.

(e) CPU

The CPU 201 develops various types of control programs stored on the ROM 202 to the RAM 203, and performs various types of control. For example, the CPU 201 controls the peripheral information acquisition equipment 205, the line-of-sight detection equipment 206, and so on by executing various control programs, and starts acquiring various types of information such as peripheral pictures.

(2-3) Drive Training Terminal

The drive training terminal 250 is used by a user who receives safe drive training, and the display picture generated by the driving picture processing device 100 may be viewed on the terminal.

The drive training terminal 250 includes, for example, a CPU 251, ROM 252, RAM 253, input/output equipment I/F 254, a communication I/F 258, an HDD 260a, and R/W equipment 260b. These components are interconnected through a bus 259.

(a) Input/Output Equipment

The input/output equipment I/F 254 is connected to input/output equipment such as a display 255, a mouse 256, a keyboard 257, and so on. The input/output equipment I/F 254 accepts an instruction to display the display picture from a user. A speaker for outputting voice and so on may be connected to the input/output equipment I/F 254.

(b) Display

The display 255 may be of any type so far as a display picture may be output. For example, the display 255 may be a flat display device, a bended or flexible display device, and a combination of a plurality of display devices.

The display area of the display 255 includes a car window display area 265 in which a car window display picture observed by the driver through a window 306 is displayed. Furthermore, the display area of the display 255 may include a mirror display area 266 in which the mirror display picture observed by the driver through the mirror 303 is displayed. The position of each mirror display area 266 corresponding to the display area of the display 255 depends on the line-of-sight origin P and the direction of the line of sight. Therefore, various correspondence tables DB 131 described later stores the occupation position of each mirror display area in the display area for each line-of-sight origin P and direction of the line of sight, and the car window display picture and the mirror display picture are displayed on the display 255 based on the correspondence.

(c) Others

The CPU 251 develops on the RAM 253 the various control programs stored on the ROM 252, acquires the data of the display picture from the driving picture processing device 100, and outputs the data to the display 255 and so on. The HDD 260a stores, for example, various types of information acquired from the driving picture processing device 100. Other configurations are substantially the same as those of the driving picture processing device 100, and the explanation is omitted here.

(3) Functional Configuration

Described next is the functional configurations of the driving picture processing device 100, the information acquisition device 200, and the drive training terminal 250.

Figure 8:
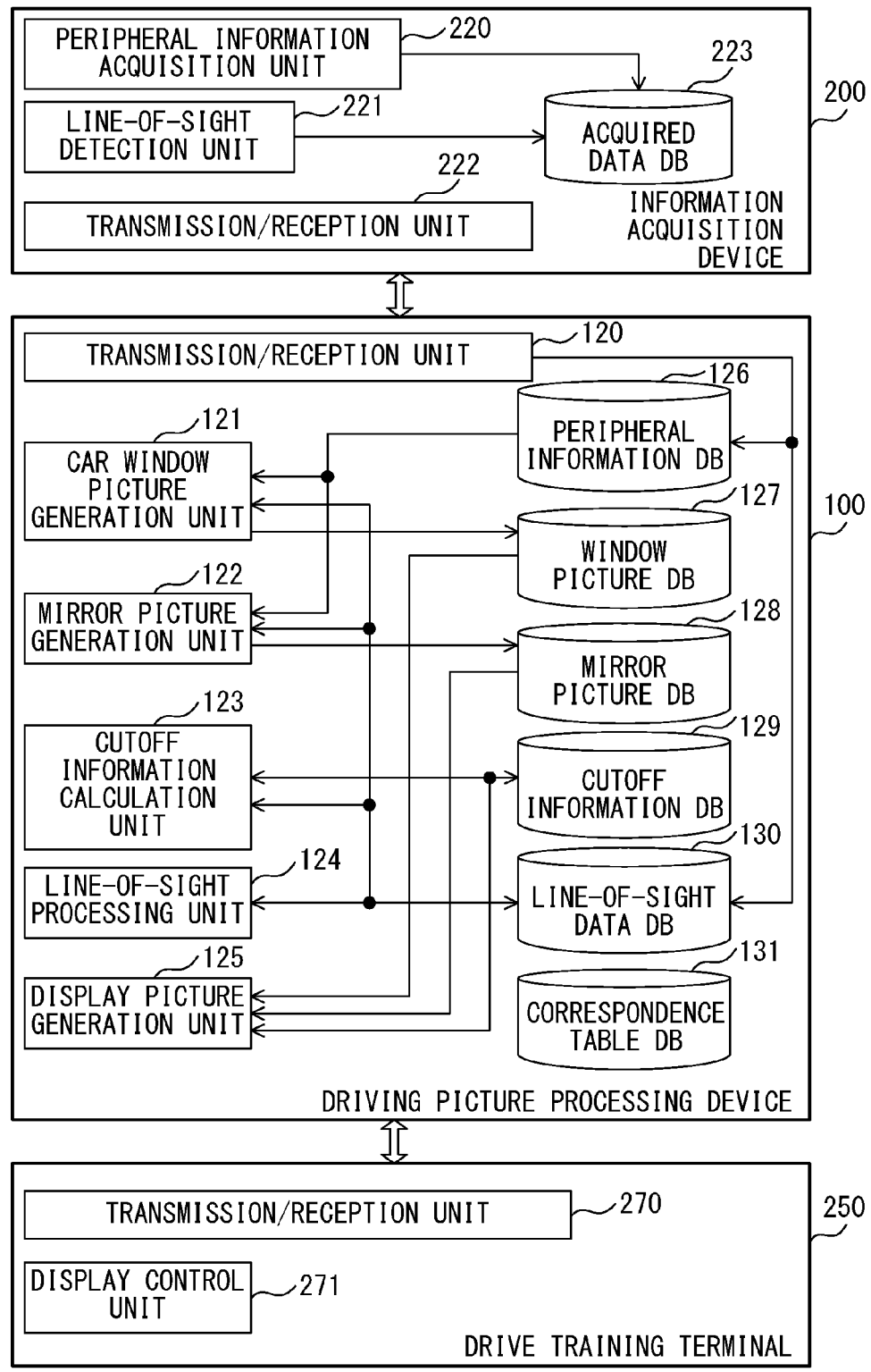
FIG. 8 is an example of a block diagram of the functional configuration of each device according to the first embodiment.

FIG. 8 is an example of a block diagram of the functional configuration of each device according to the first embodiment. The connection line of each functional unit illustrated in FIG. 8 is an example of the flow of data, and does not describe the entire data flow.

Described first below is the functional configuration of the information acquisition device 200.

(3-1) Information Acquisition Device

The information acquisition device 200 functions as each function unit described later by executing a program with each hardware configuration cooperating with one another in the information acquisition device 200.

The functional unit of the information acquisition device 200 includes, for example, a peripheral information acquisition unit 220, a line-of-sight detection unit 221, a transmission/reception unit 222, an acquired data DB 223, and so on.

(3-1-1) Peripheral Information Acquisition Unit

The peripheral information acquisition unit 220 acquires the peripheral picture shot by the peripheral information acquisition equipment 205 configured by the forward camera 205a, the right camera 205b, the left camera 205c, and the backward camera 205d illustrated in FIG. 3 and described above, and stores the picture in the acquired data DB 223.

(3-1-2) Line-of-Sight Detection Unit

The line-of-sight detection unit 221 calculates the line-of-sight origin P and a line-of-sight vector 150a indicating the direction of the line-of-sight 150 based on the pictures of the face, the eyeballs, the iris, and so on detected by the line-of-sight detection equipment 206. Hereafter, the direction of the line of sight is referred to as a line-of-sight vector in the present embodiment.

FIG. 9 is an explanatory view of an example of the method of calculating the line-of-sight origin P and the line-of-sight vector. For example, the feature points of the face are calculated based on the pictures of the face, the eyeballs, the iris, and so on, and compared with the amount of features of the face of the driver stored in advance. Next, the line-of-sight detection unit 221 extracts the direction of the face based on the comparison result, the pictures of the face, the eyeballs, the iris, and so on, and detects the central position between a left eyeball 152L and a right eyeball 152R illustrated in part (a) of FIG. 9 as the line-of-sight origin P. Furthermore, the line-of-sight detection unit 221 calculates the central position of an iris 153a, that is, the central position of a pupil 153b. Finally, the line-of-sight detection unit 221 calculates the line-of-sight vector 150a based on the central position between the line-of-sight origin P and the pupil 153b. Since the driver may move his or her head forward, backward, leftward, rightward, up and down, the position of the line-of-sight origin P corresponding to the center point O of the spatial coordinate system is changed depending on the position, the direction, and so on of the head.

The line-of-sight vector 150a may be defined by the elevation angle $\theta\beta$ made by the line-of-sight vector 150a and the XY plane and the azimuth $\theta\alpha$ which is made by the line-of-sight vector 150a and the YZ plane as illustrated by parts (b) and (c) of FIG. 9. The line-of-sight vector 150a may also be defined by the coordinates in the spatial coordinate system with any center point O of the driver's vehicle 300.

The line-of-sight detection unit 221 stores the line-of-sight origin P and the line-of-sight vector 150a in the acquired data DB 223.

(3-1-3) Acquired Data DB 223

The acquired data DB 223 stores the peripheral information, the line-of-sight data detected by the line-of-sight detection unit 221, and so on. Furthermore, the acquired data DB 223 stores all necessary data such as the model of the driver's vehicle 300 and so on for the driving picture processing device 100 to generate display pictures. The acquired data DB 223 may be configured by, for example, the RAM 203, the HDD 209a, an external recording medium, and so on.

(3-1-4) Transmission/Reception Unit

A transmission/reception unit 224 of the information acquisition device 200 transmits and receives various types of data such as commands, peripheral information, line-of-sight data, the model of the driver's vehicle 300, and so on to and from the transmission/reception unit 120 of the driving picture processing device 100.

(3-2) Driving Picture Processing Device

The driving picture processing device 100 functions as each functional unit described later by executing a program with each hardware configuration cooperating with others.

The driving picture processing device 100 according to the present embodiment extracts the line-of-sight picture corresponding to the line-of-sight origin P and the line-of-sight vector from the peripheral picture of the driver's vehicle 300. The line-of-sight picture includes a car window picture through a car window and/or a mirror picture through a mirror. The driving picture processing device 100 generates a display picture by removing the car body area of the driver's vehicle 300 which cuts off the line of sight of the driver from the line-of-sight picture or superposing the car body picture such as a pillar and so on which cuts off the line of sight of the driver on the line-of-sight picture.

The functional unit of the driving picture processing device 100 includes, for example, the transmission/reception unit 120, a car window picture generation unit 121, a mirror picture generation unit 122, a cutoff information calculation unit 123, a line-of-sight processing unit 124, a display picture generation unit 125, and so on. Furthermore, to store various types of information, the driving picture processing device 100 includes a peripheral information DB 126, a window picture DB 127, a mirror picture DB 128, a cutoff information DB 129, line-of-sight data DB 130, various correspondence table DBs 131, and so on. Each DB may be configured by, for example, the RAM 103, the HDD 110a, an external recording medium, and so on.

(3-2-1) Transmission/Reception Unit

The transmission/reception unit 120 of the driving picture processing device 100 transmits and receives various types of data, commands, and so on to and from the transmission/reception unit 222 of the information acquisition device 200. The transmission/reception unit 120 acquires various types of information such as the peripheral picture, the line-of-sight data, and so on acquired by the information acquisition device 200 from the acquired data DB 223 through the transmission/reception unit 222 in real time, and takes into each DB in the driving picture processing device 100. In this case, the transmission/reception unit 120 may acquire in real time various types of information from the peripheral information acquisition unit 220 and the line-of-sight detection unit 221 without the acquired data DB 223. Otherwise, the transmission/reception unit 222 may temporarily store various types of information about a series of operations in the acquired data DB 223 of the information acquisition device 200, and acquire the information later. That is, the various types of information is not acquired in real time, but the various types of information relating to a series of operations is temporarily stored in the acquired data DB 223, and the transmission/reception unit 222 acquires the various types of information from the acquired data DB 223 after completing the series of operations.

The transmission/reception unit 120 may include a picture acquisition unit for acquiring a peripheral picture and a line-of-sight acquisition unit for acquiring line-of-sight data.

(3-2-2) Peripheral Information DB

The peripheral information DB 126 acquires the peripheral picture around the driver's vehicle from the information acquisition device 200 as the peripheral information around the driver's vehicle and stores the information. The peripheral picture includes the pictures shot by the peripheral information acquisition equipment 205 configured by the forward camera 205a, the right camera 205b, the left camera 205c, and the backward camera 205d.

FIG. 10 is an example of a peripheral information DB. The peripheral information DB 126 stores for each frame, for example, a frame number and the picture data in each camera 205. The picture data includes a view ahead of the vehicle shot by the forward camera 205a, a right side view shot by the right camera 205b, a left side view shot by the left camera 205c, and a view behind the vehicle shot by the backward camera 205d.

(3-2-3) Line-of-Sight Data DB

The line-of-sight data DB 130 acquires the line-of-sight origin P and the line-of-sight vector 150a of the driver of the driver's vehicle from the information acquisition device 200 and stores the origin and vector.

FIG. 11 is an example of a line-of-sight data DB. The line-of-sight data DB 130 acquires for each frame a frame number, the line-of-sight origin P, and the line-of-sight vector 150a from the information acquisition device 200 and stores them. The line-of-sight vector 150a is defined by the azimuth $\theta\alpha$ and the elevation angle $\theta\beta$. The line-of-sight origin P may be defined by the coordinates in the spatial coordinate system having a center point O of the driver's vehicle 300 as an origin.

The line-of-sight data DB 130 further stores for each frame, as the information calculated by the line-of-sight processing unit 124 described later, the effective vision range, whether or not there is a mirror in the effective vision range, which mirror exists in the effective vision range, and so on. The effective vision range refers to the range in which the driver may view the line-of-sight origin P and the line-of-sight vector.

(3-2-4) Various Correspondence Table DBs

The correspondence stored in each correspondence table DB 131 is described below with the explanation of the method of generating a display picture.

The driving picture processing device 100 projects the peripheral picture of the driver's vehicle 300 on a 3-dimensional projection surface 400, and generates a car window picture and a mirror picture corresponding to the line-of-sight origin P and the line-of-sight vector of the driver from the peripheral picture projected on the 3-dimensional projection surface 400. FIG. 12 is an explanatory view of the positional relationship between the peripheral picture projected on the 3-dimensional projection surface and the car window picture and the mirror picture corresponding to the line-of-sight origin P and the line-of-sight vector.

(a) Correspondence Between the Coordinates of Each Pixel of Each Camera and the Coordinates of a 3-Dimensional Projection Surface First, the picture data shot by each camera is processed and combined, thereby generating a peripheral picture projected on the 3-dimensional projection surface 400 as illustrated in FIG. 12. The 3-dimensional projection surface 400 is, for example, a bowl-shaped projection surface having the driver's vehicle 300 at the center. Each correspondence table DB 131 stores the correspondence between the coordinates of each pixel of each of the cameras 205a through 205d and the coordinates of the 3-dimensional projection surface 400. Therefore, the car window picture generation unit 121 and the mirror picture generation unit 122 described later coordinate-convert the picture data of each pixel acquired by each of the cameras 205a through 205d into the 3-dimensional projection surface 400 based on the correspondence above, and generate a peripheral picture projected on the 3-dimensional projection surface 400.

(b) Correspondence Between the Line-of-Sight Origin P and the Line-of-Sight Vector, and the Car Window Vision Area Described next is the correspondence between the line-of-sight origin P and the line-of-sight vector, and the car window vision area. As illustrated in FIG. 12, the position of the picture which may be observed by the driver in the direction indicated by the line-of-sight vector 150a from the line-of-sight origin P is associated with the position of the peripheral picture of the 3-dimensional projection surface 400.

For example, the car window line-of-sight direction indicated by the line-of-sight vector 150a1 from the line-of-sight origin P is the forward direction from the driver's vehicle 300 through the car window. As a forward view indicated by the line-of-sight vector 150a1 from the line-of-sight origin P, a front window picture 400F is associated in the peripheral pictures of the 3-dimensional projection surface 400. In addition, the line-of-sight vector 150a1 extended from the line-of-sight origin P crosses the 3-dimensional projection surface 400 at the intersection SPa. The intersection SPa corresponds to the end of the line of sight of the driver, and corresponds to the center of the front window picture 400F. The car window line-of-sight is acquired by directly viewing an object through the car window and/or the portion corresponding to the car window, and the car window line-of-sight direction refers to the direction specified by the car window line-of-sight. On the other hand, the mirror line-of-sight described later is an indirect line of sight through a mirror, and is acquired after the line-of-sight vector 150a is reflected by the mirror 303.

Similarly, the car window line-of-sight direction indicated by the line-of-sight vector 150a2 from the line-of-sight origin P is the diagonally right forward direction of the driver's vehicle 300 through the car window. Furthermore, a right car window picture 400R in the peripheral pictures of the 3-dimensional projection surface 400 is associated as a picture in the diagonally right forward direction indicated by the line-of-sight vector 150a2 from the line-of-sight origin P. In addition, an intersection SPb at which the line-of-sight vector 150a2 extending from the line-of-sight origin P crosses the 3-dimensional projection surface 400 corresponds to the center of the right car window picture 400R.

Similarly, the car window line-of-sight direction indicated by the line-of-sight vector 150a3 from the line-of-sight origin P is the diagonally left forward direction of the driver's vehicle 300 through the car window. Furthermore, a left car window picture 400L in the peripheral pictures of the 3-dimensional projection surface 400 is associated as a picture in the diagonally left forward direction indicated by the line-of-sight vector 150a3 from the line-of-sight origin P. In addition, an intersection SPc at which the line-of-sight vector 150a3 extending from the line-of-sight origin P crosses the 3-dimensional projection surface 400 corresponds to the center of the left car window picture 400L.

Thus, the range of the car window vision area which may be observed by the driver on the 3-dimensional projection surface 400 through a window depends on the car window line-of-sight direction indicated by the line-of-sight origin P and the line-of-sight vector 150a. Each correspondence table DB 131 stores the correspondence between the line-of-sight origin P and the line-of-sight vector 150a, and the car window vision area on the 3-dimensional projection surface 400. The car window vision area is a vision area of the driver on the 3-dimensional projection surface 400 when an object is viewed through a car window and a portion corresponding to the car window, and is a vision area when the car window line-of-sight of the driver is not cut off by the car body of the driver's vehicle 300. If the car window cutoff information about the car body is added using the pillar described later and so on to the car window picture corresponding to the car window vision area, then the car window display picture with the car window line-of-sight of the driver cut off by the car body may be generated.

FIG. 18 is an example of the association between the line-of-sight origin p and the line-of-sight vector, and the car window vision area on the 3-dimensional projection surface. Each correspondence table DB 131 stores each line-of-sight origin P and the line-of-sight vector associated with the car window vision area on the 3-dimensional projection surface. For example, in the case of the line-of-sight origin P=(X1, Y1, Z1), and the line-of-sight vector=($\theta\alpha$a, $\theta\beta$a), the car window vision area 1a is associated. The car window vision area may be expressed by the information indicating the range of a coordinate group in the case of the coordinates on the 3-dimensional projection surface 400 in, for example, the spatial coordinate system having the center point O of the driver's vehicle 300 as an origin.

As illustrated in FIG. 13, the correspondence table DB 131 may store each line-of-sight origin P and line-of-sight vector as associated with the intersection SP with the 3-dimensional projection surface.

(c) Correspondence Between the Line-of-Sight Vector from the Line-of-Sight Origin P with the Car Window Cutoff Information Next, when the periphery is observed from the window of the driver's vehicle 300, the car window line-of-sight of the driver is cut off by the car body such as the pillar of the driver's vehicle 300. The area in which the car window line-of-sight of the driver depends on the line-of-sight origin P and the line-of-sight vector 150a. For example, when the line-of-sight vector of the driver refers to the diagonally right forward direction, for example, the right pillar 307R is located at the center of the vision of the driver. On the other hand, for example, when the line-of-sight vector of the driver refers to the diagonally left forward direction, the left pillar 307L is located at the center of the vision of the driver.

Each correspondence table DB 131 stores the line-of-sight origin P and the line-of-sight vector 150a as associated with the car window cutoff information about the car body of the driver's vehicle 300 which cuts off the car window line-of-sight of the driver. The car window cutoff information is the information about the cut off of the line of sight of the driver in the range of the car window vision area associated with the line-of-sight origin P and the line-of-sight vector 150a. The car window cutoff information also includes the car body area and/or car body picture of the driver's vehicle 300 which cuts off the car window line-of-sight of the driver. The car body area may be expressed by the information about the range of a coordinate group in the case of, for example, the coordinates in the display area of the display 255. Furthermore, the car body picture may be configured by the correspondence between the picture data as displayed in the display area of the display 255 and the coordinates on the display, and so on. The car body picture includes the pictures of the front pillar 307F, the dashboard 301, the right pillar 307R, the left pillar 307L, and so on.

FIG. 14 is an example of the correspondence between the line-of-sight origin P and the line-of-sight vector, and the car window cutoff information. Since the car body structure is different for each model, each correspondence table DB 131 stores for each model the line-of-sight origin P and the line-of-sight vector associated with the car window cutoff information. For example, in the case of the model=A, the line-of-sight origin P=(X1, Y1, Z1), the line-of-sight vector=($\theta\alpha$a, $\theta\beta$a), the car window cutoff information A1a is associated.

(d) Correspondence Between the Line-of-Sight Origin P and the Mirror Vision Area When the mirror 303 exists in the effective vision range with respect to the line-of-sight origin P and the line-of-sight vector of the driver, the driver may visually confirm the backward and diagonally backward conditions of the driver's vehicle 300. Each correspondence table DB 131 stores the mirror information such as the position of a mirror etc. and the line-of-sight origin P as associated with the mirror vision area which may be visually confirmed by the driver from the line-of-sight origin P through the mirror 303.

(d-1) Effective Vision Range

Described first is the relationship between the effective vision range and the mirror. The driving picture processing device 100 according to the present embodiment displays the mirror display picture through the mirror 303 on the display 255 if any mirror 303 exists in the effective vision range. The effective vision range is visually confirmed with respect to the line of sight of the driver, and is defined by, for example, the effective vision angle θe having as the center the direction indicated by the line-of-sight vector 150*a* from the line-of-sight origin P. The effective vision range may be also defined by a set of coordinates of the spatial coordinate system having as the origin the center point O of the driver's vehicle 300.

FIG. 15 is an explanatory view of the relationship between the effective vision range and the mirror, and the visual mirror confirmation range which may be visually confirmed through the mirror, the parts (a) through (c) in FIG. 15 are examples of the case in which the mirror 303 exists in the effective vision range.

In the part (a) in FIG. 15, the line-of-sight 150 of the driver is directed toward the left door mirror 303L, and the driver directly looks at the left door mirror 303L. That is, the left door mirror 303L is located at the central part of the effective vision range. In this case, the line-of-sight 150 of the driver is reflected by the left door mirror 303L, thereby indicating a mirror line-of-sight 155. That is, the line-of-sight vector 150*a* from the line-of-sight origin P is reflected by the left door mirror 303L, thereby indicating a mirror line-of-sight vector 155*a*. The left door mirror 303L has a specified shape and area, and the driver may visually confirm the state and so on of a specified visual mirror confirmation range in the backward and diagonally backward conditions of the driver's vehicle 300 through the left door mirror 303L.

In the part (b) in FIG. 15, the line-of-sight vector 150*a* of the driver is directed to the body of the driver, and is not directed in the direction of the mirror 303. However, the right door mirror 303R and the left door mirror 303L are located in the effective vision range defined by the effective vision angle θe1 having the line-of-sight vector 150*a* at the center. Therefore, the driving picture processing device 100 estimates that the driver may visually confirm the condition and so on of the specified visual mirror confirmation range in the backward and diagonally backward conditions of the driver's vehicle 300 through the right door mirror 303R and the left door mirror 303L. In this case, the effective vision angle θe1 in the case of the part (b) in FIG. 15 is expressed by the angle on the XY surface as a horizontal plane.

The effective vision angle θe may be defined not only by the angle θe1 on the XY surface, but also by the angle made with the XY surface. In the part (c) in FIG. 15, the line-of-sight vector 150*a* of the driver has a specified angle with respect to the XY surface, and the back mirror 303B is located in the effective vision range defined by the effective vision angle θe2 having the line-of-sight vector 150*a* as the center. Therefore, the driving picture processing device 100 estimates that the driver may visually confirm through the back mirror 303B the state and so on of a specified visual mirror confirmation range in the backward or diagonally backward conditions of the driver's vehicle 300.

Although the mirror 303 exists in the range of the effective vision angle θe1 in the XY plane with respect to the line-of-sight vector 150*a*, there is the case in which the mirror 303 is not located in the range of the effective vision angle θe2 made with the XY plane. In this case, the driving picture processing device 100 may determine that the mirror 303 is not visually confirmed. For example, assume that the back mirror 303B is located in the effective vision angle θe1 with respect to the line-of-sight vector 150*a*, but is not located in the effective vision angle θe2. In this case, the driving picture processing device 100 determines that the line of sight of the driver is directed downward and that the driver does not visually confirm the back mirror 303B.

(d-2) Visual Mirror Confirmation Range

Described below is the visual mirror confirmation range. The line-of-sight processing unit 124 calculates the virtual line-of-sight origin VP and the mirror vision field angle θm according to the mirror information including the model, the mirror position, the mirror angle, the shape of the mirror, and so on. The visual mirror confirmation range is determined by the virtual line-of-sight origin VP, the mirror vision field angle θm, and so on. The virtual line-of-sight origin VP is an origin for determination of the visual mirror confirmation range in which the driver may visually confirm an object through the mirror 303. The mirror vision field angle θm is an angle for definition of the visual mirror confirmation range using the virtual line-of-sight origin VP as an origin.

For example, in the case in part (a) in FIG. 15, the left door mirror 303L is in the effective vision range, and the visual mirror confirmation range is defined by the mirror vision field angle θmL made with the mirror line-of-sight vector 155*a*1 and the mirror line-of-sight vector 155*a*2 using the virtual line-of-sight origin VP as an origin. The mirror line-of-sight vectors 155*a*1 and 155*a*2 are the endmost vectors in the visually confirmable range by the driver through the left door mirror 303L, and are vectors on the boundary with the range in which an object is not visually confirmed. In addition, for example, in the case of part (b) in FIG. 15, the right door mirror 303R and the left door mirror 303L are in the effective vision range. In this case, the visual mirror confirmation range includes the visual mirror confirmation range by the right door mirror 303R and the visual mirror confirmation range by the left door mirror 303L. The visual mirror confirmation range by the left door mirror 303L is similar to the case in part (a) in FIG. 15. The visual mirror confirmation range by the right door mirror 303R is defined by the mirror vision field angle θmR made with the mirror line-of-sight vector 155*a*3 and the mirror line-of-sight vector 155*a*4 using the virtual line-of-sight origin VP as an origin. The mirror line-of-sight vectors 155*a*3 and 155*a*4 are endmost vectors in the visually confirmable range through the right door mirror 303R.

Each correspondence table DB 131 stores the mirror information and the line-of-sight origin P as associated with the virtual line-of-sight origin VP and the mirror vision field angle θm. The mirror picture generation unit 122 calculates the virtual line-of-sight origin VP and the mirror vision field angle θm based on the correspondence above, and may calculate the visual mirror confirmation range. FIGS. 16A and 16B are an example of the correspondence between the mirror information and the line-of-sight origin P, and the virtual line-of-sight origin VP, the mirror vision field angle θm, the mirror vision area, and the mirror cutoff information for each model. In FIGS. 16A and 16B, as an example, the mirror information is defined by the position of the mirror 303, and the angle defined by the azimuth $\theta_Y$ and the elevation angle $\theta\delta$ indicating the attachment angle of the mirror. For example, with the model=A, the mirror position= (Xm1, Ym1, Zm1), the mirror angle=($\theta_Y$a, $\theta\delta$a), and the line-of-sight origin P=(X1, Y1, Z1), associated are the virtual line-of-sight origin VP=(XA1a, YA1a, ZA1a) and the mirror angle=$\theta$mA1a.

(d-3) Mirror Vision Area

Described next is the mirror vision area. The mirror picture generation unit 122 described later calculates the virtual line-of-sight origin VP and the mirror vision field angle $\theta$m based on the mirror information and the line-of-sight origin P, based on which the mirror vision area on the 3-dimensional projection surface 400 is calculated.

However, although the mirror vision area may be calculated in the process above, the mirror vision area may be calculated based on the correspondence between the mirror information and the line-of-sight origin P for each model, and the each mirror vision area on the 3-dimensional projection surface 400.

The mirror vision area is a vision area of the driver on the 3-dimensional projection surface 400 through the mirror 303, and is a vision area when the mirror line-of-sight 155 reflected by the mirror 303 is not cut off by the car body of the driver's vehicle 300. When the mirror cutoff information about the car body by the pillar described later is added to the mirror picture corresponding to the mirror vision area, the mirror display picture when the line of sight of the driver is cut off by the car body is generated.

Each mirror vision area which may be visually confirmed by each of the mirrors 303R, 303L, and 303B is described using FIG. 12 again.

For example, assume that there is the right door mirror 303R in the effective vision range defined by the direction indicated by the line-of-sight vector 150a from the line-of-sight origin P. In this case, a right mirror picture 400MR is associated in the peripheral pictures of the 3-dimensional projection surface 400 as the picture in the visual mirror confirmation range through the right door mirror 303R. Similarly, when there is the left door mirror 303L in the effective vision range, a left side view 400ML is associated in the peripheral pictures of the 3-dimensional projection surface 400 as the picture in the visual mirror confirmation range through the left door mirror 303L. Similarly, when the back mirror 303B is located in the effective vision range, a back mirror picture 400MB in the peripheral pictures of the 3-dimensional projection surface 400 is associated as the picture of the visual mirror confirmation range through the back mirror 303B.

Thus, the mirror vision area which may be observed by the driver through the mirror 303 in the 3-dimensional projection surface 400 depends on the mirror 303 located in the effective vision range. Each correspondence table DB 131 stores the correspondence between the mirror information and the line-of-sight origin P, and the each mirror vision area on the 3-dimensional projection surface 400 for each model as illustrated in FIGS. 16A and 16B. For example, assume that the model=A, the mirror position=(Xm1, Ym1, Zm1), the mirror angle=($\theta_Y$ a, $\theta\delta$a), and the line-of-sight origin P=(X1, Y1, Z1). In this case, the back mirror 303B, the right door mirror 303R, and the left door mirror 303L are associated with the back mirror vision area A1a, the right door mirror vision area A1a, and the left door mirror vision area A1a. The mirror vision area may be expressed by the information about the set of the coordinates, the range of a coordinate group on the 3-dimensional projection surface 400 in the spatial coordinate system using the center point O of the driver's vehicle 300 as an origin.

The line-of-sight processing unit 124 designates the mirror 303 in the effective vision range from the line-of-sight data DB 130 based on the line-of-sight origin P and the line-of-sight vector. Furthermore, the mirror picture generation unit 122 reads the mirror vision area of the mirror 303 in the effective vision range in the three mirror vision areas corresponding to the line-of-sight origin P, thereby generating a mirror picture.

(e) Correspondence Between the Line-of-Sight Origin P and the Mirror Cutoff Information When the driver observes the periphery through the mirror 303 of the driver's vehicle 300, the mirror line-of-sight 155 reflected by the mirror 303 or the driver is cut off by the car body of a pillar and so on of the driver's vehicle 300. In addition, by the reflection by the window may cut off the mirror line-of-sight 155 of the driver.

Each correspondence table DB 131 stores the mirror information and the line-of-sight origin P as associated with the mirror cutoff information about the car body of the driver's vehicle 300 which cuts off the mirror line-of-sight 155 of the driver for each model. The mirror cutoff information includes the area of the car body and/or the car body picture of the driver's vehicle 300 which cut off the mirror line-of-sight 155 of the driver. For example, with the model=A, the mirror position=(Xm1, Ym1, Zm1), the mirror angle=($\theta_Y$ a, $\theta\delta$a), and the line-of-sight origin P=(X1, Y1, Z1), the back mirror cutoff information A1a, the right mirror cutoff information A1a, and the left mirror cutoff information A1a are associated.

(f) Position of Mirror Display Area in Display Area of Display

Next, the position of the mirror display area 266 corresponding to the display area of the display 255 is described with reference to FIGS. 12, and 17 through 19. FIGS. 17 through 19 are explanatory views of the relationship between the car window picture on the 3-dimensional projection surface and the mirror picture, and the display area of the display.

The driving picture processing device 100 generates a car window picture and/or a mirror picture from the peripheral picture on the 3-dimensional projection surface 400 based on the line-of-sight origin P and the line-of-sight vector 150a. Furthermore, the driving picture processing device 100 generates a display picture obtained by adding the car window cutoff information and/or mirror cutoff information to the car window picture and/or mirror picture. The display area of the display 255 includes the car window display area 265 and the mirror display area 266. The mirror display area 266 is a part of the areas of the display areas of the display 255, and the car window display area 265 is a display area of the display 255 excluding the mirror display area 266. The car window display area 265 displays a car window display picture made of the car window picture and the car window cutoff information. The mirror display area 266 displays a mirror display picture made of the mirror picture and mirror cutoff information. If the line-of-sight origin P and the line-of-sight vector 150a change, the position of the mirror 303 in the vision of the driver also changes. Therefore, the position of the mirror display area 266 in the display area of the display 255 also changes.

For example, in FIG. 12, assume that the driver looks ahead, the line-of-sight data of the driver is the line-of-sight origin P and the line-of-sight vector 150a1, and there is the back mirror 303B in the effective vision range. The driver may visually confirm the front window picture 400F and the back mirror picture 400MB. In this case, as illustrated in FIG. 17, the front window picture 400F is displayed in the car window display area 265 in the display area of the display 255. In addition, the back mirror picture 400MB is displayed in the back mirror display area 266B in the display area of the display 255. In this case, the intersection SPa between the line of sight of the driver and the 3-dimensional projection surface 400 is coordinate-converted into the intersection SPa' at the center of the display area of the display 255. The point MPa of the back mirror picture 400MB is coordinate-converted into the point MPa' of the back mirror display area 266B.

In FIG. 12, assume that the driver is headed in the diagonally right forward direction, the line-of-sight data of the driver is the line-of-sight origin P and the line-of-sight vector 150a2, and there are the back mirror 303B and the right door mirror 303R in the effective vision range. The driver may visually confirm the right car window picture 400R, the back mirror picture 400MB, and the right mirror picture 400MR. In this case, as illustrated in FIG. 18, the right car window picture 400R is displayed in the car window display area 265. In addition, the back mirror picture 400MB is displayed in the back mirror display area 266B in the display area of the display 255. Furthermore, the right mirror picture 400MR is displayed in the right mirror display area 266R. In this case, the intersection SPb between the line of sight of the driver and the 3-dimensional projection surface 400 is coordinate-converted to the point SPb' at the central portion of the display area of the display 255. The point MPa of the back mirror picture 400MB is coordinate-converted to the point MPa' of the back mirror display area 266B. Furthermore, the point MPb of the right mirror picture 400MR is coordinate-converted to the point MPb' of the right mirror display area 266R.

Furthermore, in FIG. 12, assume that the driver is headed in the diagonally left forward direction, the line-of-sight data of the driver is the line-of-sight origin P and the line-of-sight vector 150a3, and there are the back mirror 303B and the left door mirror 303L in the effective vision range. The driver may visually confirm the left car window picture 400L, the back mirror picture 400MB, and the left mirror picture 400ML. In this case, as illustrated in FIG. 19, the left car window picture 400L is displayed in the car window display area 265. In addition, the back mirror picture 400MB is displayed in the back mirror display area 266B, and the left mirror picture 400ML is displayed on the left mirror display area 266L. In this case, the intersection SPc between the line of sight of the driver and the 3-dimensional projection surface 400 is coordinate-converted to the point SPc' at the central portion of the display area of the display 255. The point MPa of the back mirror picture 400MB is coordinate-converted to the point MPa' of the back mirror display area 266B. Furthermore, the point MPc of the left mirror picture 400ML is coordinate-converted to the point MPc' of the right mirror display area 266L.

Thus, the position of the mirror display area 266 in the display area of the display 255 depends on the line-of-sight origin P and the line-of-sight vector. Each correspondence table DB 131 stores the line-of-sight origin P and the line-of-sight vector as associated with each mirror display area as illustrated in FIG. 20. FIG. 20 is an example of the correspondence between the line-of-sight origin P and the line-of-sight vector, and each mirror display area. For example, with the line-of-sight origin P=(X1, Y1, Z1), and the line-of-sight vector=(θαa, θβa), the back mirror display area 266B and the right mirror display area 266R are associated.

(g) Others

Each correspondence table DB 131 stores all other information about the model of the vehicle whose display picture for generation of the display picture by the driving picture processing device 100, the angle of the effective vision angle θe, and so on. The effective vision angle θe is set as, for example, a vision angle which may visually confirmed by a common driver.

In addition, the correspondence of each correspondence table DB 131 is performed by considering the distortion correction performed when a picture taken by a camera is projected on the 3-dimensional projection surface 400, the distortion correction performed when the peripheral picture projected on the 3-dimensional projection surface 400 is converted on the display 255, and so on.

Each correspondence table DB 131 may be stored with the above-mentioned correspondence using, for example, an equation. For example, the relationship between the line-of-sight origin P and the line-of-sight vector in FIG. 13 and the car window vision area on the 3-dimensional projection surface 400 may be regulated by an equation and then stored.

The above-mentioned correspondence is only an example, and, for example, a more detailed correspondence may be performed, and a rougher correspondence may be presented.

T (3-2-5) Line-of-Sight Picture Generation Unit

The line-of-sight processing unit 124 calculates the effective vision range, and determines whether or not there is the mirror 303 in the effective vision range as illustrated in FIG. 15.

The line-of-sight processing unit 124 reads the line-of-sight origin P and the line-of-sight vector 150a from the line-of-sight data DB 130, and calculates the effective vision range based on the line-of-sight origin P, the line-of-sight vector 150a, and the effective vision angle θe as a specified angle. The effective vision range is defined by the effective vision angle θe using as the center the line-of-sight vector 150a extending from the line-of-sight origin P, and is defined by a set of coordinates of the spatial coordinate system.

Next, the line-of-sight processing unit 124 determines which mirror 303 exists in the effective vision range as illustrated in parts (b) and (c) in FIG. 15 based on the mirror position of each mirror 303 of the driver's vehicle 300. For example, when the coordinates indicating the mirror position of the left door mirror 303L are included in the set of coordinates which define the effective vision range, the line-of-sight processing unit 124 determines that the left door mirror 303L is included in the effective vision range.

The line-of-sight processing unit 124 stores the effective vision range and the determination result in the line-of-sight data DB 130. The line-of-sight data DB 130 stores, as illustrated in FIG. 11, the effective vision range in each frame, the type of mirror existing in the effective vision range, and "NO" when no mirror exists in the effective vision range. For example, in the frame of the frame number 3, the line-of-sight origin P=(XP3, YP3, ZP3), the line-of-sight vector=(θα_3, θβ_3) are stored. In this case, the effective vision range=range_3, and the back mirror 303B and the right door mirror 303R exist in the effective vision range. On the other hand, in the frame of the frame number 4, the line-of-sight origin P=(XP4, YP4, ZP4), and the line-of-sight vector=(θα_4, θβ_4) are stored, but there is no mirror 303 in the effective vision range=range_4. Therefore, "NO" is stored.

(3-2-6) Car Window Picture Generation Unit, Car Window Picture DB

The car window picture generation unit 121 generates a car window picture corresponding to the line-of-sight origin P of the driver and the line-of-sight vector from the peripheral picture of the driver's vehicle 300.

For example, the car window picture generation unit 121 reads the peripheral information about the target frame from the peripheral information DB 126 in FIG. 10, and projects the information on the 3-dimensional projection surface 400 as illustrated in FIG. 12. The car window picture generation unit 121 reads the line-of-sight origin P and the line-of-sight vector 150a from the line-of-sight data DB 130 in FIG. 11 relating to the target frame. Next, the car window picture generation unit 121 reads the car window vision area on the 3-dimensional projection surface 400 from the correspondence table DB 131 in FIG. 13 based on the line-of-sight origin P and the line-of-sight vector 150a. Finally, the car window picture generation unit 121 extracts the picture corresponding to the car window vision area, from the 3-dimensional projection surface 400 on which the peripheral picture of the driver's vehicle 300 is projected, and processes the picture into the car window picture which may be displayed in the car window display area 265 of the display 255.

The window picture DB 127 stores the car window picture generated by the car window picture generation unit 121. FIG. 21 is an example of a window picture DB. The window picture DB 127 stores a car window picture for each frame.

(3-2-7) Mirror Picture Generation Unit, Mirror Picture DB

The mirror picture generation unit 122 generates a mirror picture which may be visually confirmed by the mirror 303 when there is any mirror 303 in the effective vision range in the target frame.

For example, as with the car window picture generation unit 121, the mirror picture generation unit 122 projects the peripheral information about the target frame on the 3-dimensional projection surface 400. Otherwise, the mirror picture generation unit 122 may use the peripheral picture of the 3-dimensional projection surface 400 generated by the car window picture generation unit 121.

The mirror picture generation unit 122 reads the line-of-sight origin P and the information about which mirror 303 exists in the effective vision range relating to a target frame from the line-of-sight data DB 130 in FIG. 11. Next, the mirror picture generation unit 122 reads the mirror vision area of the corresponding mirror from each correspondence table DB 131 based on the line-of-sight origin P and the mirror 303 in the effective vision range. For example, assume that the mirror picture generation unit 122 determines that there is the back mirror 303B and the right door mirror 303R in the effective vision range by referring to the line-of-sight data DB 130 relating to certain line-of-sight origin P and line-of-sight vector. In this case, the mirror picture generation unit 122 refers to each correspondence table DB 131 in FIGS. 16 A and 16B, and reads the back mirror vision area and the right vision area in the three mirror vision areas associated with the corresponding line-of-sight origin P.

Finally, the mirror picture generation unit 122 extracts each picture corresponding to each mirror vision area from the 3-dimensional projection surface 400 on which the peripheral picture of the driver's vehicle 300 is projected, and processes each picture into a mirror picture which may be displayed in the mirror display area 266 of the display 255.

The mirror picture generation unit 122 refers to the line-of-sight data DB 130 in FIG. 11, and when it determines that there is no mirror 303 in the effective vision range, no mirror picture is generated.

The mirror picture DB 128 stores the mirror picture generated by the mirror picture generation unit 122. FIG. 22 is an example of a mirror picture DB. The mirror picture DB 128 stores the type of mirror 303 in the effective vision range, and the mirror picture for each frame. When there are a plurality of mirrors 303 in the effective vision range, it stores each mirror picture of each mirror in one frame. In addition, when there is no mirror 303 in the effective vision range, "NO" is stored.

(3-2-8) Cutoff Information Generation Unit, Cutoff Information DB

The cutoff information calculation unit 123 generates cutoff information about the car body of the driver's vehicle 300 which cuts off the line of sight of the driver. The cutoff information includes cutoff information about the car window which cuts off the car window line-of-sight of the driver, and mirror cutoff information about the cut off of the mirror line-of-sight of the driver reflected by the mirror 303.

For example, the cutoff information calculation unit 123 reads the line-of-sight origin P and the line-of-sight vector 150a from the line-of-sight data DB 130 in FIG. 11 relating to the target frame. In addition, the cutoff information calculation unit 123 reads the car window cutoff information from each correspondence table DB 131 in FIG. 14 based on the type of the driver's vehicle, the line-of-sight origin P, and the line-of-sight vector 150a, and stores the information in the cutoff information DB 129.

Furthermore, the cutoff information calculation unit 123 reads the information about which mirror 303 exists in the effective vision range from the line-of-sight data DB 130 in FIG. 11 relating to the target frame. The cutoff information calculation unit 123 reads the mirror cutoff information about the corresponding mirror 303 from each correspondence table DB 131 in FIGS. 16 A and 16B based on the line-of-sight origin P and the mirror 303 in the effective vision range, and stores the information in the cutoff information DB 129.

FIG. 23 is an example of the cutoff information DB. The cutoff information DB 129 stores for each frame the car window cutoff information, the type of the mirror 303 in the effective vision range, and the mirror cutoff information. When there are a plurality of mirrors 303 in the effective vision range, one frame stores the mirror cutoff information about each mirror 303. If there is not mirror 303 in the effective vision range, "NO" is stored.

(3-2-9) Display Picture Generation Unit (a) Generating Car Window Display Picture The display picture generation unit 125 generates a car window display picture based on the car window picture in the window picture DB 127 and the car window cutoff information in the cutoff information DB 129 for each frame. For example, in the case of the frame of the frame number 1, the display picture generation unit 125 reads the car window picture_1 from the window picture DB 127 in FIG. 21. In addition, the display picture generation unit 125 reads the car window cutoff information_1 of the frame number 1 from the cutoff information DB 129 in FIG. 23. The display picture generation unit 125 generates the car window display picture_1 of the frame number 1 based on the window picture_1 and the car window cutoff information_1. In this case, the display picture generation unit 125 generates a car window display picture by removing the car window cutoff information as a car body area such as a pillar and so on which cuts off the line of sight of the driver from the car window picture, thereby generating a car window display picture. Otherwise, for example, the display picture generation unit 125 generates a car window display picture by superposing the car window cutoff information as a car body picture such as a pillar which cuts off the line of sight of the driver toward the periphery of the driver's vehicle on the car window picture.

FIG. 24 is an example of a picture used in a car window display picture. FIGS. 25 through 27 are examples of car window display pictures. As illustrated in FIG. 24, the driver's vehicle 300 is traveling on the traffic lane 600. Ahead of the driver's vehicle 300, another vehicle 500*a* is traveling on the traffic lane 600. Diagonally right ahead of the driver's vehicle, a vehicle 500*b* is travelling on a traffic lane 601. A walker 500*c* is walking on a sidewalk 602.

In the state in FIG. 24, as indicated by the line-of-sight origin P and the line-of-sight vector 150*a*1 in FIG. 12, it is assumed that the driver is looking ahead. In this case, the display picture generation unit 125 generates a car window picture as illustrated in part (a) in FIG. 25. In part (a) in FIG. 25, the pictures through car windows including the vehicles 500*a* and 500*b*, and the walker 500*c* are displayed. Furthermore, the car window cutoff information is combined with the pictures through the car windows in part (a) in FIG. 25, thereby generating a car window display picture illustrated by (b) in FIG. 25. In part (b) in FIG. 25, the car body area which cuts off the line of sight is removed from the car window picture, and the car window display picture is generated. The car body area which cuts off the line of sight is indicated by diagonal lines which are not observed by the driver. The car body area in part (b) in FIG. 25 includes, for example, a car body area 280F by the front pillar 307F, a car body area 280R by the right pillar 307R, a car body area 280 by the right pillar 307R, a car body area 280D by a car body area 280L, and the dashboard 301. The point SPa' is the central part of the display area of the display 255.

In the state in FIG. 24, as indicated by the line-of-sight origin P and the line-of-sight vector 150*a*2 in FIG. 12, it is assumed that the driver is looking diagonally right ahead. In this case, the display picture generation unit 125 generates a car window picture as illustrated in part (a) in FIG. 26. In part (a) in FIG. 25, the pictures through car windows including the vehicles 500*a* and 500*b* are displayed. Furthermore, the car window cutoff information is combined with the pictures through the car windows in part (a) in FIG. 25, thereby generating a car window display picture illustrated by (b) in FIG. 25. In part (b) in FIG. 25, the car body area includes, for example, the car body area 280F by the front pillar 307F, the car body area 280R by the right pillar 307R, and the car body area 280D by the dashboard 301.

Furthermore, in the state in FIG. 24, as indicated by the line-of-sight origin P and the line-of-sight vector 150*a*3 in FIG. 12, it is assumed that the driver is looking diagonally left ahead. In this case, the display picture generation unit 125 generates a car window picture as illustrated in part (a) in FIG. 27. In part (a) in FIG. 27, the pictures through car windows including the vehicle 500*a* and walker 500*c* are displayed. Furthermore, the car window cutoff information is combined with the pictures through the car windows in part (a) in FIG. 27, thereby generating a car window display picture illustrated by (b) in FIG. 27. In part (b) in FIG. 27, the car body area includes, for example, the car body area 280F by the front pillar 307F, the car body area 280L by the left pillar 307L, and the car body area 280D by the dashboard 301.

(b) Generating Mirror Display Picture

The display picture generation unit 125 generates a mirror display picture according to the mirror picture in the mirror picture DB 128 and the mirror cutoff information about the cutoff information DB 129 when there is a mirror in the effective vision range. For example, with reference to FIG. 22, since there is no mirror in the effective vision range in the frame of frame number 1, the display picture generation unit 125 generates no mirror display picture. On the other hand, the display picture generation unit 125 reads the back mirror picture_2 from the mirror picture DB 128 in FIG. 22. Furthermore, the display picture generation unit 125 reads the mirror cutoff information_2 of the frame number 2 from the cutoff information DB 129 in FIG. 23. The display picture generation unit 125 generates a mirror display picture_2 with the frame number 2 according to the mirror picture_2 and the mirror cutoff information_2. The method of generating a mirror display picture from the mirror picture and the mirror cutoff information is the same as that of the above-mentioned car window display picture.

(c) Combining Car Window Display Picture and Mirror Display Picture

The display picture generation unit 125 combines the car window display picture with the mirror display picture, thereby generating a display picture.

For example, the display picture generation unit 125 reads the line-of-sight origin P and the line-of-sight vector from the line-of-sight data DB 130 in FIG. 11. Furthermore, the display picture generation unit 125 reads the mirror display area based on the line-of-sight origin P and the line-of-sight vector from each correspondence table DB 131 in FIG. 20. Then, the display picture generation unit 125 superposes the mirror display picture on the car window display picture based on the mirror display area, thereby generating a display picture.

FIG. 28 is an example of a display picture obtained by superposing a back mirror picture on the back mirror display area 266B in part (b) in FIG. 26. FIG. 29 is an example of a display picture obtained by superposing a right mirror picture on the right mirror display area 266R in part (b) in FIG. 26. Thus, the display picture generation unit 125 generates a display picture on which a mirror picture is superposed in the mirror display area of the mirror 303 in the effective vision area. The display picture generation unit 125 does not superpose a mirror picture on the mirror display area of the mirror 303 not located in the effective vision range.

(3-3) Drive Training Terminal

The functional unit of the drive training terminal 250 in FIG. 8 includes, for example, a transmission/reception unit 270 and a display control unit 271. The drive training terminal 250 accepts an instruction to display a desired display picture from a viewer through the mouse 256 and the keyboard 257. The transmission/reception unit 270 outputs the instruction to display the display picture to the display picture generation unit 125 of the driving picture processing device 100. The transmission/reception unit 270 also receives a desired display picture from the display picture generation unit 125, and displays the display picture on the display 255.

(4) Flow of Processes

Described below is a flow of processes performed by the driving picture processing device 100 according to the first embodiment.

FIG. 30 is a flowchart of an example of the flow of the processes performed by the driving picture processing device according to the first embodiment. The driving picture processing device 100 acquires peripheral information and line-of-sight data from the information acquisition device 200 for each frame, and stores them in the peripheral information DB 126 and the line-of-sight data DB 130. The following processes are performed on, for example, each frame.

Steps S1, S2: The driving picture processing device 100 sequentially adds the frame numbers i from 0.

Step S3: The car window picture generation unit 121 and the mirror picture generation unit 122 reads the peripheral information from the peripheral information DB 126, and reads the line-of-sight data from the line-of-sight data DB 130 for the frame number i. The cutoff information calculation unit 123, the line-of-sight processing unit 124, and the display picture generation unit 125 reads the line-of-sight data from the line-of-sight data DB 130 for the target frame number i.

Step S4: The car window picture generation unit 121 projects the peripheral information about the target frame to the 3-dimensional projection surface 400.

Step S5: The car window picture generation unit 121 reads the car window vision area on the 3-dimensional projection surface 400 from the correspondence table DB 131 based on the line-of-sight origin P and the line-of-sight vector 150a. Next, the car window picture generation unit 121 extracts a picture corresponding to the car window vision area from the 3-dimensional projection surface 400. Furthermore, the car window picture generation unit 121 processes the extracted picture into a car window picture which may be displayed in the car window display area 265 of the display 255, and stores the picture in the window picture DB 127.

Step S6: The cutoff information calculation unit 123 reads the car window cutoff information from the correspondence table DB 131 based on the type of the driver's vehicle, the line-of-sight origin P, and the line-of-sight vector 150a from the correspondence table DB 131, and stores the information in the cutoff information DB 129.

Step S7: The display picture generation unit 125 reads the car window picture in the window picture DB 127 and the car window cutoff information in the cutoff information DB 129 for the target frame number i, combines the car window picture with the car window cutoff information, and generates a car window display picture.

Step S8: The line-of-sight processing unit 124 calculates the effective vision range based on the line-of-sight origin P and the line-of-sight vector 150a, and the effective vision angle θe of a specified angle as illustrated in part (b) and (c) in FIG. 15. Next, the line-of-sight processing unit 124 determines which mirror 303 exists in the effective vision range based on, for example, the mirror position corresponding to the model of the driver's vehicle 300. If any mirror 303 is located in the effective vision range, control is passed to step S9. No mirror 303 is located in the effective vision range, control is passed to step S12.

Step S9: The mirror picture generation unit 122 reads the mirror vision area of the corresponding mirror from the correspondence table DB 131 based on the line-of-sight origin P and the mirror 303 located in the effective vision range. The information about the mirror 303 located in the effective vision range is included in the line-of-sight data in the line-of-sight data DB 130. The mirror picture generation unit 122 extracts each picture corresponding to each mirror vision area. Furthermore, the mirror picture generation unit 122 processes the extracted picture into a mirror picture which may be displayed in the mirror display area 266 of the display 255, and stores the picture in the mirror picture DB 128.

Step S10: The cutoff information calculation unit 123 reads the mirror cutoff information about the corresponding mirror from the correspondence table DB 131 based on the line-of-sight origin P and the mirror 303 in the effective vision range, and stores the information in the cutoff information DB 129.

Step S11: The display picture generation unit 125 reads the mirror picture in the mirror picture DB 128 and the mirror cutoff information in the cutoff information DB 129 for the target frame number i, combines the mirror picture with the mirror cutoff information, and generates a mirror display picture.

Step S12: The display picture generation unit 125 reads a mirror display area from the correspondence table DB 131 based on the line-of-sight origin P and the line-of-sight vector. Next, the display picture generation unit 125 generates a display picture by superposing a mirror display picture on the car window display picture based on the mirror display area.

Step S13: If the frame of the frame number i is the final frame, the process terminates. Otherwise, control is returned to step S2.

(5) Effect of Operation

The driving picture processing device 100 may reflect the area in which the line of sight of the driver is cut off by a car body such as a pillar and so on in the process above. That is, a display picture which is actually to be visually confirmed by the driver may be generated. Therefore, the viewer of the display picture may grasp the actual state in which a certain area is a hidden by a car body such as a pillar, or in which a dangerous driving has taken place by a dead area by viewing the display picture whose cutoff information is reflected using the drive training terminal 250. Thus, the safe drive training may be effectively performed.

Furthermore, since a display picture is a picture having the line of sight of a driver at the center, the viewer of the display picture may view an object by feeling as if the viewer were practically driving a vehicle. Especially, when the viewer views the display picture of performing dangerous driving, the viewer may grasp the state in which the driver was driving the vehicle during the dangerous driving, and may obtain the feeling of actually performing the dangerous driving. Therefore, effective safe drive training may be performed by providing a strong impression for a viewer about the dangerous driving in a specific situation, thereby effectively utilizing the training in practical driving.

Furthermore, when there is a mirror in the effective vision range, not only the car window display picture but also a mirror display picture for observation by the driver through the mirror may be included in the display picture. Thus, the viewer of the display picture may confirm not only the periphery situation observed by the driver through the car window, but also the periphery situation which may be observed through the mirror in the effective vision range. Thus, safe drive training may be realized by evaluating the line of sight of the driver and the driving state based on all situations in which the driver actually performs the observation.

(6) Variation Example

(6-1) Variation Example 1

In the first embodiment described above, as illustrated in FIGS. 25 through 27, the display picture is displayed on the display 255 so that the center of the end of the line of sight of the driver may be positioned at the center of the display 255. Thus, although the line-of-sight origin P and the line-of-sight vector of the driver change, the center of the line of sight is fixed to the central portion of the display 255. On the other hand, the picture in the effective vision range of the driver moves depending on the center of the line of sight as illustrated in FIGS. 25 and 26.

However, in the present variation example, as illustrated in FIG. 33 described below, the vision area of the display picture displayed on the display 255 is fixed on the 3-dimensional projection surface 400. The vision area is referred to as a fixed vision area in the present variation example. In the present variation example, a line-of-sight locus 281 of a driver in each frame is displayed on the display 255. A line-of-sight locus generation unit in the scope of the claims of the patent is included in the line-of-sight processing unit 124.

(a) Fixed Vision Area

A fixed vision area 400*fix* is first described below with reference to FIG. 31. FIG. 31 is an explanatory view of the positions of the fixed vision area on the 3-dimensional projection surface 400, and the car window picture and the mirror picture. For example, assume that, among a specified number of frames, the line-of-sight vector has moved as illustrated by the line-of-sight vector 150*a*1, 150*a*2, and 150*a*3 using the line-of-sight origin P as an origin. The front window picture 400F is associated as a picture in the forward direction indicated by the line-of-sight vector 150*a*1 from the line-of-sight origin P. Similarly, the right car window picture 400R and the left car window picture 400L are associated as pictures in the direction indicated by the line-of-sight vector 150*a*2 and 150*a*3 from the line-of-sight origin P. The fixed vision area 400*fix* is set so that the driver includes the picture which may be visually confirmed by the driver among the specified number of frames. That is, the fixed vision area 400*fix* is set so that the right car window picture 400R and the left car window picture 400L may be included.

Furthermore, as illustrated in FIG. 31, the back mirror picture 400MB is associated with the back mirror 303B. The right mirror picture 400MR is associated with the right door mirror 303R. The left mirror picture 400ML is associated with the left door mirror 303L.

The fixed vision area 400*fix* may be a constantly fixed area, or depends on the line-of-sight origin P and the line-of-sight vector. For example, the size and the position of the fixed vision area 400*fix* may depend on the average sight-of-line origin Pav and the average sight-of-line vector among the specified number of frames. For example, the line-of-sight processing unit 124 calculates the average sight-of-line origin Pav by averaging the line-of-sight origin P among the specified number of frames, and calculates the average sight-of-line vector by averaging the line-of-sight vector among the specified number of frames. Each correspondence table DB 131 stores the correspondence among the average sight-of-line origin Pav and the average sight-of-line vector, the fixed vision area 400*fix* on the 3-dimensional projection surface 400, and the intersection SP of the average sight-of-line vector from the average sight-of-line origin Pav and the 3-dimensional projection surface 400.

Therefore, the car window picture generation unit 121 may determine the fixed vision area 400*fix* from each car window picture generation unit 121 based on the average sight-of-line origin Pav and the average sight-of-line vector.

(b) Relationship Between the Car Window Picture and the Mirror Picture, and the Display Area of Display FIG. 32 is an explanatory view of the relationship between the car window picture and the mirror picture on the 3-dimensional projection surface, and the display area of the display. The display area of the display 255 includes the car window display area 265 and the mirror display area 266. In the present embodiment, the relationship in position between the car window display area 265 and the mirror display area 266. In the present variation example, the positional relationship between the car window display area 265 and the mirror display area 266 is fixed, and is set as a specified positional relationship.

The car window display area 265 displays the car window display picture configured by a car window picture corresponding to the fixed vision area 400*fix* and the car window cutoff information. The mirror display area 266 includes the back mirror display area 266B, the right mirror display area 266R, and the left mirror display area 266L. The back mirror display area 266B, the right mirror display area 266R, and the left mirror display area 266L display the respective mirror display pictures configured by the respective mirror pictures 400MB, 400MR, and the 400 MB, and the mirror cutoff information of each mirror.

(c) Flow of Processes

Described briefly below is the flow of the following processes.

The car window picture generation unit 121 projects the peripheral information about a target frame on the 3-dimensional projection surface 400. Next, the car window picture generation unit 121 extracts a picture corresponding to the fixed vision area 400*fix* from the 3-dimensional projection surface 400 on which the peripheral picture is projected, processes the picture as a car window picture which may be displayed on the display 255, and stores the resultant picture in the window picture DB 127.

The correspondence table DB 131 stores the car model, the line-of-sight origin P, and the line-of-sight vector 150*a* as associated with the car window cutoff information fix about the car body of the driver's vehicle 300 which cuts off the car window line-of-sight of the driver. The car window cutoff information fix indicates the cutoff of the sight-of-line of the driver.

The cutoff information calculation unit 123 reads the car window cutoff information fix from the correspondence table DB 131 based on the model of the driver's vehicle, the line-of-sight origin P, and the line-of-sight vector 150*a*, and stores the information in the cutoff information DB 129.

The display picture generation unit 125 generates a car window display picture corresponding to the fixed vision area 400*fix* for the target frame based on the car window picture in the fixed vision area 400*fix* and the car window cutoff information fix.

In addition, the line-of-sight processing unit 124 calculates the effective vision range based on the line-of-sight origin P and the line-of-sight vector 150*a*, and the effective vision angle θe of a specified angle, and determines which mirror 303 exists in the effective vision range. The line-of-sight processing unit 124 also refers to FIG. 13 described above, and calculates the intersection SPa between the line-of-sight vector 150*a* extending from the line-of-sight origin P, and the 3-dimensional projection surface 400 based on the line-of-sight origin P and the line-of-sight vector 150*a*. Furthermore, the line-of-sight processing unit 124 coordinate-converts the intersection SPa on the 3-dimensional projection surface 400 into the point on the display 255, thereby calculating the sight-of-line locus.

As in the first embodiment above, the mirror picture generation unit 122 reads the mirror vision area of the mirror in the effective vision range from the correspondence table DB 131 in FIGS. 16 A and 16B based on the line-of-sight origin P and the mirror 303 located in the effective vision range. The mirror picture generation unit 122 extracts each picture corresponding to each mirror vision area from the 3-dimensional projection surface 400 on which the peripheral picture is projected, processes the extracted picture into a mirror picture, and stores the resultant picture in the mirror picture DB 128.

The cutoff information calculation unit 123 reads the mirror cutoff information about the corresponding mirror from the correspondence table DB 131 based on the line-of-sight origin P, and the mirror 303 existing in the effective vision range as with the first embodiment, and stores the information in the cutoff information DB 129.

The display picture generation unit 125 generates a mirror display picture according to the mirror picture and the mirror cutoff information for a target frame. Furthermore, the display picture generation unit 125 superposes the mirror display picture on the car window display picture based on specified position relationship, and further superposes a sight-of-line locus, thereby generating a display picture.

(d) Example of Display Picture

In the processes above, for example, the display picture as illustrated in, for example, FIG. 33 is displayed on the display 255. FIG. 33 is an example of a display picture.

In FIG. 33, the car window display picture corresponding to the fixed vision area 400*fix* is displayed on the car window display area 265. The car window display picture includes the car window cutoff information configured by the car body area 280F by the front pillar 307F, the car body area 280R by the right pillar 307R, the car body area 280L by the left pillar 307L, and the car body area 280D by the dashboard 301.

In the example illustrated in FIG. 33, only the back mirror 303B exists in the effective vision range of the driver, and the back mirror picture 400MB is displayed in the back mirror display area 266B. Since other right door mirror 303R and left door mirror 303L are not located in the effective vision range, the right mirror display area right mirror display area 266R and the left mirror display area 266L display no pictures.

Furthermore, in FIG. 33, the line-of-sight locus 281 of the driver is displayed. Thus, since the sight-of-line locus of the driver is superposed on the display picture, the viewer may grasp what object other than the driver's vehicle the driver has or has not visually confirmed during the driving of the driver's vehicle. Thus, for example, the cause of the dangerous driving, for example, due to no recognizing an object to be visually confirmed, and so on, is analyzed, thereby utilizing the obtained data in safe drive training.

With the generated display picture, the range of the fixed vision area 400*fix* on the 3-dimensional projection surface 400 does not change. However, the line-of-sight locus 281 is generated depending on the movement of the sight-of-line of the driver, and the car window cutoff information changes. Since the car window cutoff information changes, the car body area of, for example, a pillar and so on also changed depending on the movement of the sight-of-line as illustrated in, for example, FIG. 33. Also depending on the movement of the sight-of-line of the driver, the mirror display area 266 in which the mirror display picture is displayed changes.

(6-2) Variation Example 2

Depending on the level of the tension during the driving and the concentration on the driving, the vision range in which the driver may visually confirm changes. For example, when the driver is nervous or concentrates his or her attention too much on one object, the vision range of the driver tends to be narrowed. Then, according to the present variation example, the vision range is calculated according to the biological information such as the diameter of the pupils, the number of pulses, the state of the pulses, the amount of perspiration, the retention time of the sight-of-line, and so on, and a display picture is processed depending on the vision range.

FIG. 34 is an example of a block diagram of the functional configuration of each device relating to the variation example 2. The functional configuration of the present variation example includes a vision calculation unit 132 in addition to the functional configuration of the first embodiment in FIG. 8.

The vision range may be calculated according to the biological information such as the diameter of the pupils, the number of pulses, the state of the pulses, the amount of perspiration, the retention time of the sight-of-line, and so on. The biological information may be detected by each detection unit.

The diameter of pupils may be measured by the line-of-sight detection unit 221. For example, the line-of-sight detection unit 221 acquires the picture of an eye, extracts the image of the pupil, and measures the diameter of the pupil. Otherwise, the line-of-sight detection unit 221 emits light such as infrared and so on, and measures the diameter of the pupil based on the wave reflected by the eye.

The number of pulses may be measured by a measure attached to the handle 302 based on the blood flow through the hands at the handle 302. The measure has a plus electrode or a minus electrode at the positions of the right and left hands on the steering wheel.

The amount of perspiration may be measured by the measure attached to the handle 302 based on the perspiration emitted from the hands on the handle 302.

The retention time of the sight-of-line may be obtained by calculating the time in which the sight-of-line is held in each direction of vector based on the line-of-sight origin P and the line-of-sight vector 150*a*.

The information for calculation of the vision range is not limited to the information described above, but may be various types of biological information such as blood pressure and so on.

The information for calculation of the vision range is provided for the vision calculation unit 132.

(b) Calculation of Vision Range

The vision calculation unit 132 calculates the vision range according to the information for calculation of the above-mentioned vision range. For example, the correspondence table DB 131 stores the correspondence between the diameter of the pupils, the number of pulses, the state of the pulses, the amount of perspiration, the retention time of the sight-of-line, and so on, as associated with the vision range. For example, the smaller the diameter of the pupils, the smaller the vision range. Furthermore, the larger the number of pulses, the smaller the vision range. The vision calculation unit 132 refers to the correspondence, and calculates the vision range. The vision range is expressed by the coordinates in the display area of the display 255.

(c) Process of the Picture Depending on the Vision Range

The display picture generation unit 125 acquires the vision range from the vision calculation unit 132, and processes the display picture based on the vision range.

FIG. 35 is an explanatory view of an example of processing a display picture. The point SP as the center of the end portion of the sight-of-line of the driver is located at the center of the display area of the display 255, and the vision range VR including the point SP is calculated. The vision range VF is, for example, L1 long and L2 wide. The vision range VF is not limited to a rectangle, but may be circular, oval, and so on.

It is assumed that the driver is able to visually confirm the state of the periphery of the driver's vehicle in the vision range. On the other hand, it is assumed that the state of the periphery of the driver's vehicle is not visually confirmed outside the vision range. The display picture generation unit 125 performs the process so that the display picture may be clearly confirmed in the vision range VF, and the display picture may be faded in the display area outside the vision range VF.

With the above-mentioned processing on the display picture, the state of the observation by the driver may be estimated and reproduced. Thus, the viewer may confirm the display picture depending on the vision range of the driver. Thus, for example, when a target which has caused dangerous driving by, for example, a narrow vision, due to not grasping the target by the driver may be effectively analyzed using the display picture above.

(6-3) Variation Example 3

In the first embodiment above, the driving picture processing device 100 projects a peripheral picture on the 3-dimensional projection surface 400, extracts a car window picture and a mirror picture from the peripheral picture on the 3-dimensional projection surface 400, and processes the pictures so that they may be displayed on the display 255. However, the driving picture processing device 100 may generate a car window picture and a mirror picture which may be displayed on the display 255 from the peripheral picture acquired from each of the cameras 205*a* through 205*d*. Therefore, for example, the correspondence table DB 131 stores for each line-of-sight origin P and line-of-sight vector the correspondence between the coordinates of each pixel configuring the picture corresponding to the car window line-of-sight in the peripheral pictures with the coordinates on the display area of the display 255. The car window picture generation unit 121 coordinate-converts the picture data corresponding to the sight-of-line of the driver in the peripheral pictures into the display area of the display 255 from the peripheral information acquisition equipment 205 based on the specified line-of-sight origin P and line-of-sight vector, and the correspondence. Thus, a car window picture corresponding to the line-of-sight origin P and the line-of-sight vector of the driver may be generated.

The same holds true with the mirror picture. For example, each correspondence table DB 131 stores the correspondence between the coordinates of each pixel configuring the picture corresponding to the mirror line-of-sight in the peripheral pictures as associated with the coordinates in the display area of the display 255 in association with the mirror information and the line-of-sight origin P. The mirror picture generation unit 122 generates a mirror picture based on the correspondence for the mirror 303 in the effective vision range.

(6-4) Variation Example 4

The driving picture processing device 100 according to the first embodiment superposes the car window display picture and the mirror display picture to generate a display picture as illustrated in FIGS. 28 and 29. However, the driving picture processing device 100 may generate only the car window display picture as a display picture, or generate only the mirror display picture as a display picture.

Second Embodiment

The driving picture processing device 100 according to the first embodiment acquires the peripheral information and the line-of-sight data around the driver's vehicle from an external information acquisition device 200. On the other hand, the driving picture processing device 100 according to the second embodiment acquires the information. Described below are the differences from the first embodiment.

The configuration of the driving picture processing device 100 according to the second embodiment is described below. FIG. 36 is an example of a block diagram of the hardware configuration of the driving picture processing device.

The driving picture processing device 100 has, for example, the CPU 101, the ROM 102, the RAM 103, the input/output equipment I/F 104, and the communication I/F 108. They are interconnected through the bus 109.

The input/output equipment I/F 104 is connected to the input/output equipment such as the display 105, the mouse 106, the keyboard 107, the peripheral information acquisition equipment 205, the line-of-sight detection equipment 206, and so on.

The functional configuration of the driving picture processing device 100 is described below. FIG. 37 is an example of a block diagram of the functional configuration of the driving picture processing device according to the second embodiment. The driving picture processing device 100 according to the second embodiment includes the peripheral information acquisition unit 220 and the line-of-sight detection unit 221 in addition to the driving picture processing device 100 according to the first embodiment. Since the driving picture processing device 100 according to the second embodiment does not transmit or receive data, commands, and so on to or from the information acquisition device 200, the transmission/reception units 120 and 222 and the acquired data DB 223 are omitted here. The processing of each function is similar to that according to the first embodiment.

Other configurations are similar to those according to the first embodiment. Furthermore, in the second embodiment, a variation example of the first embodiment may be applied.

Other Embodiments

A computer program for directing a computer to perform the method above and a computer-readable recording medium which stores the computer program are included in the scope of the present invention. The computer-readable recording medium may be, for example, a flexible disk, a hard disk, CD-ROM (compact disc read only memory), an MO (magneto optical disk), a DVD, DVD-ROM, DVD-RAM (DVD: random access memory), BD (blue-ray disk), USB memory, semiconductor memory, and so on. The computer program is not limited to that stored on the recording medium, but may be transmitted through an electric communication circuit, a wireless or cable communication circuit, a network represented by the Internet. However, a computer-readable recording medium does not include a carrier wave in which a computer program is embedded. A computer program transmitted by being embedded in a carrier wave, which is a computer readable recording medium which stores the program is a recording medium having a physical entity to be reproduced in a recording medium reading device which is connected to a transmitting computer.

The present invention may provide a picture processing device, a picture processing method, and a picture processing program which generate a picture for generating a picture obtained by a driver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A picture processing device, comprising:
a memory; and
a processor coupled to the memory and configured to:
   acquire peripheral information including a picture obtained by shooting a periphery of a driver's vehicle,
   acquire a line-of-sight origin and a direction of the line of sight of a driver of the driver's vehicle, the line-of-sight origin being a central position between a left eyeball and a right eyeball of the driver,
   generate from the peripheral information which is acquired at a certain point in time, a line-of-sight picture, which corresponds to the line-of-sight origin, at the certain point in time by extracting the line-of-sight picture from the picture included in the peripheral information at the certain point in time based on the line-of-sight origin and the direction of the line of sight,
   calculate cutoff information including a vehicle body area or a vehicle body picture of the driver's vehicle which cuts off a line of sight of the driver based on the line-of-sight origin; and
   generate a display picture according to the line-of-sight picture and the cutoff information,
wherein:
   the line-of-sight picture includes a mirror picture corresponding to a visual mirror confirmation range in which the driver may perform a visual confirmation through at least one mirror of the driver's vehicle,
   the cutoff information includes mirror cutoff information containing a vehicle body area and/or a vehicle body picture of the driver's vehicle which cuts off a mirror line-of-sight of the driver to the visual mirror confirmation range,
   the display picture includes a mirror display picture for observation by the driver through at least one mirror of the driver's vehicle,
   the processor is further configured to:
      calculate an effective vision range having a specified angle range in which the driver may perform a visual confirmation based on the line-of-sight origin and the direction of the line of sight, and determine whether there is at least one mirror of the driver's vehicle in the effective vision range,
      calculate the visual mirror confirmation range in which the driver may perform a visual confirmation through the mirror of the driver's vehicle according to mirror information including the line-of-sight origin and a position of the mirror when at least one mirror is located in the effective vision range, and generate the mirror picture corresponding to the visual mirror confirmation range from a peripheral picture of the driver's vehicle,
      calculate the mirror cutoff information based on the line-of-sight origin and the visual mirror confirmation range, and
      generate the mirror display picture according to the mirror picture and the mirror cutoff information.

2. The picture processing device according to claim 1, wherein:
the direction of the line of sight includes a vehicle window line-of-sight direction from the line-of-sight origin through a window of the driver's vehicle;
the line-of-sight picture includes a vehicle window picture corresponding to the line-of-sight origin and the vehicle window line-of-sight direction;
the cutoff information includes vehicle window cutoff information containing a vehicle body area and/or a vehicle body picture of the driver's vehicle about cutoff of the sight-of-line in the vehicle window line-of-sight direction of the driver;
the display picture includes a vehicle window display picture for observation by the driver through a window of the driver's vehicle;
wherein the processor is further configured to:
   generate the vehicle window picture from a peripheral picture of the driver's vehicle,
   calculate the vehicle window cutoff information based on the line-of-sight origin, and
   generate the vehicle window display picture according to the vehicle window picture and the vehicle window cutoff information.

3. The picture processing device according to claim 1, wherein
the processor superposes the mirror display picture corresponding to a mirror in the effective vision range on the vehicle window display picture when at least one mirror is located in the effective vision range.

4. The picture processing device according to claim 1, wherein the processor is further configured to:
calculate a vision range of the driver according to at least one piece of biological information including a pupil, a number of pulses, perspiration, and a retention time in the direction of the line of sight; and
process the display picture based on the vision range.

5. The picture processing device according to claim 1, wherein the processor is further configured to:
fade an area outside the vision range in the display picture.

6. The picture processing device according to claim 1, wherein the processor is further configured to:
generate a sight-of-line locus in the line-of-sight picture which is designated by the line-of-sight origin and the direction of the line of sight; and
superpose the sight-of-line locus on the display picture.

7. The picture processing device according to claim 1, wherein
the line-of-sight origin is an average line-of-sight origin obtained by averaging line-of-sight origin of the driver in a specified time; and
the direction of the line of sight is an average direction of the line of sight obtained by averaging a direction of the line of sight in the specified time.

8. The picture processing device according to claim 1, wherein the processor is further configured to:
generate a projection picture by projecting a peripheral picture of the driver's vehicle on a 3-dimensional projection surface as a virtual space, and generate as the sight-of-line picture a picture corresponding to the line-of-sight origin and the direction of the line of sight in the projection picture.

9. The picture processing device according to claim 1, wherein the processor is further configured to:
generate the display picture by removing a picture of an area of a body of the driver's vehicle included in the cutoff information from the line-of-sight picture.

10. The picture processing device according to claim 1, wherein the processor is further configured to:
generate the display picture by superposing a vehicle body picture of the driver's vehicle included in the cutoff information on the line-of-sight picture.

11. A non-transitory medium which stores a picture processing program used to direct a processor to perform a process, the process comprising: acquiring peripheral information including a picture obtained by shooting a periphery of a driver's vehicle; acquiring a line-of-sight origin and a direction of the line of sight of a driver of the driver's vehicle, the line-of-sight origin being a central position between a left eyeball and a right eyeball of the driver; generating from the peripheral information, which is acquired by the acquiring the peripheral information at a certain point in time, a line-of-sight picture, which corresponds to the line-of-sight origin, at the certain point in time by extracting the line-of-sight picture from the picture included in the peripheral information at the certain point in time based on the line-of-sight origin and the direction of the line of sight; calculating cutoff information including a car vehicle body area or a car vehicle body picture of the driver's vehicle which cuts off a line of sight of the driver based on the line-of-sight origin; and generating a display picture according to the line-of-sight picture and the cutoff information, wherein: the line-of-sight picture includes a mirror picture corresponding to a visual mirror confirmation range in which the driver may perform a visual confirmation through at least one mirror of the driver's vehicle, the cutoff information includes mirror cutoff information containing a vehicle body area and/or a vehicle body picture of the driver's vehicle which cuts off a mirror line-of-sight of the driver to the visual mirror confirmation range, the display picture includes a mirror display picture for observation by the driver through at least one mirror of the driver's vehicle, the process further comprises: calculating an effective vision range having a specified angle range in which the driver may perform a visual confirmation based on the line-of-sight origin and the direction of the line of sight, and determine whether there is at least one mirror of the driver's vehicle in the effective vision range, calculating the visual mirror confirmation range in which the driver may perform a visual confirmation through the mirror of the driver's vehicle according to mirror information including the line-of-sight origin and a position of the mirror when at least one mirror is located in the effective vision range, and generate the mirror picture corresponding to the visual mirror confirmation range from a peripheral picture of the driver's vehicle, calculating the mirror cutoff information based on the line-of-sight origin and the visual mirror confirmation range, and generating the mirror display picture according to the mirror picture and the mirror cutoff information.

12. A method for allowing a processor to perform a process, the method comprising:
acquiring peripheral information including a picture obtained by shooting a periphery of a driver's vehicle;
acquiring a line-of-sight origin and a direction of the line of sight of a driver of the driver's vehicle, the line-of-sight origin being a central position between a left eyeball and a right eyeball of the driver;
generating from the peripheral information, which is acquired by the acquiring the peripheral information at a certain point in time, a line-of-sight picture, which corresponds to the line-of-sight origin, at the certain point by extracting the line-of-sight picture from the picture included in the peripheral information at the certain point based on the line-of-sight origin and the direction of the line of sight;
calculating cutoff information including a vehicle body area or a vehicle body picture of the driver's vehicle which cuts off a line of sight of the driver based on the line-of-sight origin; and
generating a display picture according to the line-of-sight picture and the cutoff information,
wherein:
the line-of-sight picture includes a mirror picture corresponding to a visual mirror confirmation range in which the driver may perform a visual confirmation through at least one mirror of the driver's vehicle,
the cutoff information includes mirror cutoff information containing a vehicle body area and/or a vehicle body picture of the driver's vehicle which cuts off a mirror line-of-sight of the driver to the visual mirror confirmation range,
the display picture includes a mirror display picture for observation by the driver through at least one mirror of the driver's vehicle,
the method further comprises:
calculating an effective vision range having a specified angle range in which the driver may perform a visual confirmation based on the line-of-sight origin and the direction of the line of sight, and determine whether there is at least one mirror of the driver's vehicle in the effective vision range,
calculating the visual mirror confirmation range in which the driver may perform a visual confirmation through the mirror of the driver's vehicle according to mirror information including the line-of-sight origin and a position of the mirror when at least one mirror is located in the effective vision range, and generate the mirror picture corresponding to the visual mirror confirmation range from a peripheral picture of the driver's vehicle,
calculating the mirror cutoff information based on the line-of-sight origin and the visual mirror confirmation range, and
generating the mirror display picture according to the mirror picture and the mirror cutoff information.

* * * * *